US010754779B2

(12) United States Patent
Hashimoto et al.

(10) Patent No.: US 10,754,779 B2
(45) Date of Patent: Aug. 25, 2020

(54) INFORMATION PROCESSING DEVICE AND METHOD FOR MANAGING FILE

(71) Applicant: Sony Computer Entertainment Inc., Tokyo (JP)

(72) Inventors: Takeshi Hashimoto, Tokyo (JP); Masaki Takahashi, Kanagawa (JP); Hideya Muraoka, Tokyo (JP); Naoto Okino, Tokyo (JP); Andrew R Thaler, Santa Monica, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 48 days.

(21) Appl. No.: 14/759,938

(22) PCT Filed: Oct. 4, 2013

(86) PCT No.: PCT/JP2013/005920
§ 371 (c)(1),
(2) Date: Jul. 9, 2015

(87) PCT Pub. No.: WO2014/111985
PCT Pub. Date: Jul. 24, 2014

(65) Prior Publication Data
US 2015/0356018 A1    Dec. 10, 2015

Related U.S. Application Data

(60) Provisional application No. 61/753,450, filed on Jan. 17, 2013.

(51) Int. Cl.
*G06F 12/08* (2016.01)
*G06F 12/0868* (2016.01)
(Continued)

(52) U.S. Cl.
CPC .......... *G06F 12/0868* (2013.01); *A63F 13/77* (2014.09); *A63F 13/95* (2014.09);
(Continued)

(58) Field of Classification Search
CPC ......... G06F 17/30598; G06F 2212/464; G06F 12/0868; G06F 3/0611; G06F 3/064;
(Continued)

(56) References Cited

U.S. PATENT DOCUMENTS 6,795,382 B2 * 9/2004 Kitamura ............... G06F 3/0613
                                                     369/47.11
7,028,295 B2    4/2006 Li et al.
(Continued)

FOREIGN PATENT DOCUMENTS

CN    1416057 A    5/2003
CN    1605471 A    4/2005
(Continued)

OTHER PUBLICATIONS

International Search Report for corresponding PCT Application No. PCT/JP2013/005918, 1 page, dated Nov. 9, 2013.
(Continued)

*Primary Examiner* — David Yi
*Assistant Examiner* — Zubair Ahmed
(74) *Attorney, Agent, or Firm* — Matthew B. Dernier, Esq.

(57) ABSTRACT

A media drive is loaded with a ROM medium on which a plurality of files constituting an application are recorded. A readout block reads out data from the media drive. A memory temporarily stores the read-out data. A providing block provides the data stored in the memory to game software. A recording processing block records the data stored in the memory in an auxiliary storage device.

8 Claims, 13 Drawing Sheets

(51) Int. Cl.

| | | |
|---|---|---|
| *G06F 3/06* | (2006.01) | |
| *G06F 16/28* | (2019.01) | |
| *A63F 13/77* | (2014.01) | |
| *A63F 13/95* | (2014.01) | |
| *H04L 29/08* | (2006.01) | |

(52) U.S. Cl.
CPC .............. *G06F 3/064* (2013.01); *G06F 3/068* (2013.01); *G06F 3/0611* (2013.01); *G06F 3/0643* (2013.01); *G06F 3/0656* (2013.01); *G06F 16/285* (2019.01); *G06F 2212/1024* (2013.01); *G06F 2212/1721* (2013.01); *G06F 2212/2112* (2013.01); *G06F 2212/281* (2013.01); *G06F 2212/311* (2013.01); *G06F 2212/464* (2013.01); *H04L 67/06* (2013.01)

(58) Field of Classification Search
CPC ...... G06F 3/0643; G06F 3/0656; G06F 3/068; G06F 2212/1024; G06F 2212/1721; G06F 2212/2112; G06F 2212/281; G06F 2212/311; A63F 13/77; A63F 13/95; H04L 7/06

See application file for complete search history.

(56) References Cited

U.S. PATENT DOCUMENTS

| | | | |
|---|---|---|---|
| 7,320,087 B2 | 1/2008 | Sato | |
| 8,078,803 B2 | 12/2011 | Speier | |
| 8,843,459 B1 | 9/2014 | Aston | |
| 9,201,787 B2 | 12/2015 | Lee | |
| 9,201,794 B2 | 12/2015 | Gill | |
| 9,239,784 B1 | 1/2016 | Haghighi | |
| 9,669,314 B2 | 6/2017 | Tsuchiya | |
| 2003/0097400 A1 | 5/2003 | Li et al. | |
| 2004/0003179 A1 | 1/2004 | Shirahige | |
| 2004/0107291 A1 | 6/2004 | Gamo | |
| 2004/0250167 A1 | 12/2004 | Sato | |
| 2005/0223165 A1 | 10/2005 | Schmidt | |
| 2007/0078009 A1 | 4/2007 | Lockton | |
| 2007/0111802 A1 | 5/2007 | Ishihara | |
| 2007/0239938 A1 | 10/2007 | Pong | |
| 2007/0276767 A1 | 11/2007 | Kim | |
| 2008/0183967 A1 | 7/2008 | Speier | |
| 2008/0244080 A1 | 10/2008 | James | |
| 2009/0158005 A1 | 6/2009 | Carmichael | |
| 2009/0207704 A1* | 8/2009 | Hirano ............. | G11B 20/10527 369/47.12 |
| 2009/0305790 A1* | 12/2009 | Lu ........................ | G06T 15/005 463/42 |
| 2010/0088466 A1 | 4/2010 | Nakanishi | |
| 2011/0032250 A1* | 2/2011 | Tanaka .................... | A63F 13/77 345/418 |
| 2011/0055821 A1* | 3/2011 | Tanaka ...................... | G06F 8/65 717/170 |
| 2011/0196667 A1 | 8/2011 | Sasaki | |
| 2012/0004040 A1* | 1/2012 | Pereira ................. | A63F 13/358 463/42 |
| 2012/0192171 A1 | 7/2012 | Tanaka | |
| 2012/0233564 A1 | 9/2012 | Tsuchiya | |
| 2012/0297142 A1 | 11/2012 | Gill | |
| 2012/0297144 A1 | 11/2012 | Gill | |
| 2013/0232229 A1 | 9/2013 | Firman | |
| 2014/0125576 A1 | 5/2014 | Asuke | |
| 2014/0280393 A1 | 9/2014 | Giampaolo | |

FOREIGN PATENT DOCUMENTS

| | | |
|---|---|---|
| CN | 1898742 A | 1/2007 |
| CN | 1957333 A | 5/2007 |
| CN | 101013427 A | 8/2007 |
| CN | 101595462 A | 12/2009 |
| CN | 101689144 A | 3/2010 |
| CN | 102238179 A | 11/2011 |
| CN | 102708274 A | 10/2012 |
| CN | 102841854 A | 12/2012 |
| CN | 103314598 A | 9/2013 |
| EP | 1582986 A | 10/2005 |
| JP | 11065914 A | 3/1999 |
| JP | 11174952 A | 7/1999 |
| JP | 2002358208 A1 | 12/2002 |
| JP | 2003288290 A | 10/2003 |
| JP | 2004295542 A | 10/2004 |
| JP | 2006120191 A | 5/2006 |
| JP | 2007287175 A | 11/2007 |
| JP | 2008077442 A | 4/2008 |
| JP | 2009509717 A | 3/2009 |
| JP | 2011018277 A | 1/2011 |
| JP | 2011161704 A | 8/2011 |
| JP | 201237981 A | 2/2012 |
| JP | 4925230 B2 | 4/2012 |
| JP | 2012187209 A | 10/2012 |
| WO | 0133852 A1 | 5/2001 |

OTHER PUBLICATIONS

International Preliminary Report on Patentability and Written Opinion for related PCT Application No. PCT/JP2013/005918, 10 pages, dated Jul. 30, 2015.
International Preliminary Report on Patentability and Written Opinion for related PCT Application No. PCT/JP2013/005920, 11 pages, dated Jul. 30, 2015.
Office Action for related U.S. Appl. No. 14/153,648, 11 pages, dated Oct. 18, 2015.
Office Action for related U.S. Appl. No. 14/153,648, 11 pages, dated Feb. 19, 2016.
International Search Report for corresponding PCT Application No. PCT/JP2013/005920, dated Dec. 24, 2013.
Hikaru Nomura, 30 Pun de Wakaru Kihon Soft noTsukaikata, Mac People Beginners, 3 pages vol. 7, (Jan. 8, 2001) (For relevancy see International Search Report for corresponding PCT Application No. PCT/JP2013/005920, dated Dec. 24, 2013 cited above).
Search Report for corresponding EP Patent Application No. 13871772. 3-1905, 7 pages, dated Sep. 21, 2016.
Search Report for corresponding EP Patent Application No. 13872060, 8 pages, dated Sep. 1, 2016.
Office Action for corresponding JP Patent Application No. 2014-557184, 12 pages, dated Aug. 9, 2016.
Office Action for corresponding CN Patent Application No. 2013800701772, 13 pages, dated Apr. 28, 2017.
Office Action for corresponding Chinese Patent Application No. 2014105752052, 21 pages, dated May 4, 2017.
Office Action for related U.S. Appl. No. 14/514,534, 13 pages, dated Jan. 26, 2017.
Office Action for related U.S. Appl. No. 14/514,534, 19 pages, dated Oct. 19, 2017.
Office Action for related U.S. Appl. No. 14/514,534, 12 pages, dated Jul. 29, 2016.
Bach, M. "How it Works: Intel SSD Caching", <https://www.pugetsystems.com>, Puget Systems 3 pages (Jun. 29, 2012).
"Memory & Storage Hierarchy", http://www.computerhistory.org/revolution/memory-storage/8/249/2227 1 page (Apr. 20, 2011).
Office Action for related U.S. Appl. No. 14/514,534, 14 pages, dated Apr. 18, 2018 (This reference is being recited in order to correct the date of the office action, which was incorrectly dated in the IDS filed Apr. 19, 2018. The Office Action was submitted on Apr. 19, 2018).
Mark Brownstein, "What a Simple Hard Drive Format Does" The Aleratec Blog, [http://site.aleratec.com/blog/201010831/simple-hard-drive-format/] 2 pages, Aug. 31, 2010.
Office Action for corresponding CN Application No. 201380070206. 5, 14 pages, dated Mar. 27, 2018.
Office Action for related U.S. Appl. No. 14/514,534, 17 pages, dated Jul. 27, 2018.
Tyson, J. "How Computer Memory Works", HowStuffWorks,Inc. copyrighted, 2 pages [https ://computer.howstuffworks.com/computer -memory. html] (1998-2013).

(56) References Cited

OTHER PUBLICATIONS

Office Action for related matter U.S. Appl. No. 14/514,534, 18 pages, dated Feb. 7, 2019.
"Measuring Drive Performance Average Access Time"< https://www.maths.tcd.ie/-nora/DT315-1/Storage%20Devices.pdf> 3 pages, (Jan. 23, 2013).

* cited by examiner

| GROUP | #1 | #2 | #3 | #4 | #5 | ... |
|---|---|---|---|---|---|---|
| FILE | A,B,C,D,E,F | G,H | G,I,J | G,K,L | K,M,N | ... |

72a  72b  72c  72d  72e

F I G . 8
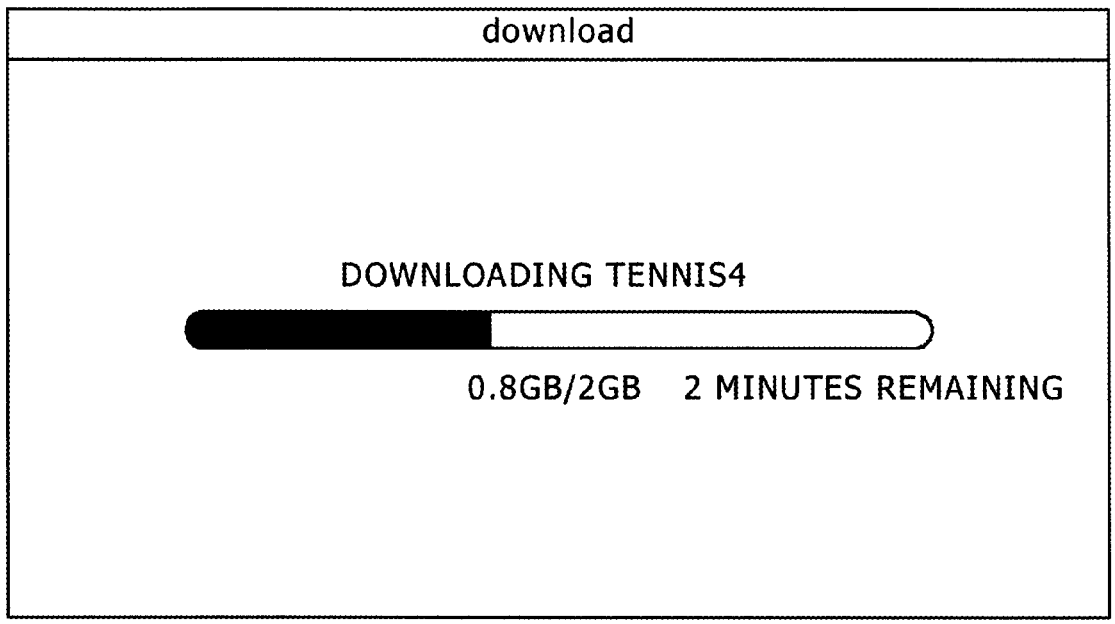
4

INFORMATION PROCESSING DEVICE AND METHOD FOR MANAGING FILE

TECHNICAL FIELD

The present invention relates to an information processing technology carried out by an information processing device such as a game device or the like.

BACKGROUND ART

Conventionally, game software has been distributed and sold in the forms of ROM media such as optical disks, magneto-optical disks, Blu-ray disks, and the like. In addition, an increase in speed of data communication on the Internet has recently enabled game servers to distribute game software via the Internet.

CITATION LIST

Patent Literature

[PTL1] US2011/32250, [PTL2] US2012/192171

SUMMARY

Technical Problems

However, there are some areas in which broadband lines are not provided. In such areas, there is a problem that it takes time to download game software. When the processing speed of game devices is improved, the data size of manufactured game software tends to be correspondingly increased. For example, downloading data having a data size of a few ten gigabytes (GB) to a few hundred GB is expected to take a few ten minutes to a few ten hours depending on the broadband line.

When a game device purchases and downloads game software via the Internet, a user of course desires to play the game immediately after purchasing the game. However, when it takes a long time to complete the download, it cannot possibly be said that the user can immediately play the game after purchasing the game. It is therefore desirable to construct a mechanism that enables the user to play the game immediately when downloading the game software.

In addition, the game device generally has auxiliary storage devices such as a hard disk drive (HDD), a flash memory, and the like. The readout of data from these auxiliary storage devices is performed at higher speed than the readout of data from ROM media inserted in a drive device. In a game involving a large amount of operation for three-dimensional (3D) graphics, for example, data is desired to be read out and passed to the game as fast as possible. Thus, from a viewpoint of data processing, it is desirable to read out necessary data from an auxiliary storage device to execute the game after copying game software recorded on a ROM medium to the auxiliary storage device.

However, when the data size of the game software is increased as described above, it takes a considerable time to copy all of files constituting the game software into the auxiliary storage device, and in the meantime, the user is made to wait to play the game. It is therefore desirable to construct a mechanism in which when the game software is recorded on the ROM medium, the game being executed can realize as fast data access as possible while enabling the user to play the game.

It is accordingly an object of the present invention to provide a technology for realizing an environment in which the user can play the game comfortably.

Solution to Problems

In order to solve the above problems, according to a mode of the present invention, there is provided an information processing device including: a drive device loaded with a recording medium on which a plurality of files constituting an application are recorded; a readout block reading out data from the drive device; a memory for temporarily storing the data read out by the readout block; a providing block for providing the data stored in the memory to the application being executed; a storage device; and a processing block recording the data stored in the memory to the storage device.

Another mode of the present invention is a data copying method. This method includes: a step of executing an application; a step of reading out data from a drive device loaded with a recording medium on which a plurality of files constituting the application are recorded; a step of temporarily storing the read-out data in a memory; a step of providing the data stored in the memory to the application; and a step of recording the data stored in the memory in a storage device.

It is to be noted that arbitrary combinations of the above-described constituent elements as well as methods, devices, systems, recording media, computer programs, and the like into which expressions of the present invention are converted are also effective as modes of the present invention.

Advantageous Effect of Invention

According to the information processing technology of the present invention, an environment in which a user can play a game comfortably can be realized.

BRIEF DESCRIPTION OF DRAWINGS

FIG. 8 is a diagram showing an example of download conditions displayed on a display.

DESCRIPTION OF EMBODIMENT

Figure 1:
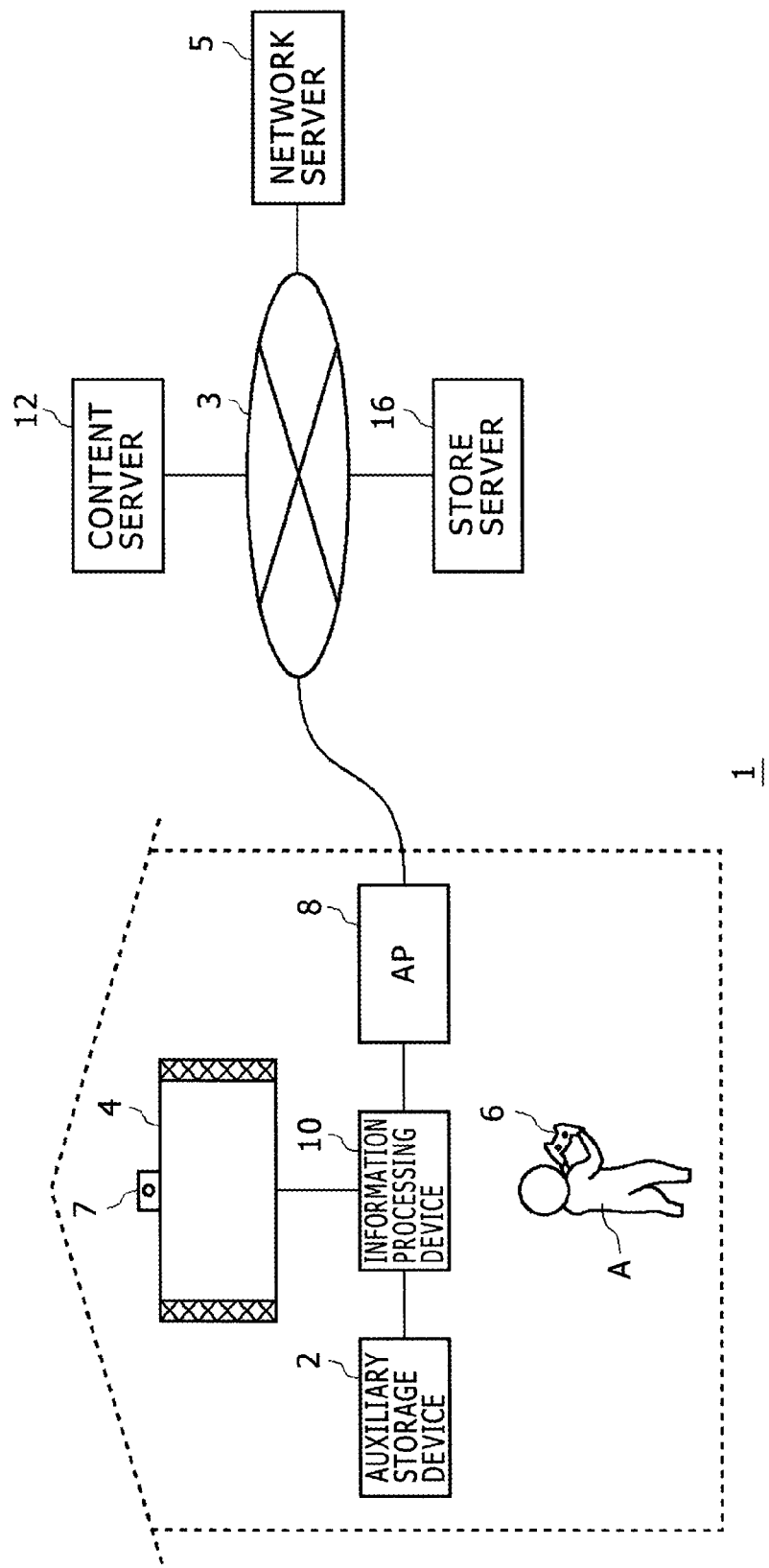
FIG. 1 is a diagram showing an information processing system according to an embodiment of the present invention.

FIG. 1 shows an information processing system 1 according to an embodiment of the present invention. The information processing system 1 includes an information processing device 10, a network server 5, a content server 12 for distributing digital contents, and a store server 16 for selling the digital contents. The information processing device and the servers are connected to each other via a network 3 such as the Internet, a LAN (Local Area Network), or the like. The content server 12 is maintained and managed by a manufacturer, a publisher, or the like of the digital contents.

An access point (hereinafter referred to as an "AP") 8 has functions of a wireless access point and a router. The information processing device 10 is connected to the AP 8 via radio or wire, and is thus connected to the network server 5, the content server 12, and the store server 16 on the network 3 in such a manner as to be able to communicate with the network server 5, the content server 12, and the store server 16.

The information processing device 10 is connected to an input device 6 operated by a user by radio or wire. The input device 6 outputs operation information indicating a result of operation by the user to the information processing device 10. When receiving the operation information from the input device 6, the information processing device 10 reflects the operation information in processing of system software or application software, and makes a result of the processing output from an output device 4. In the information processing system 1, the information processing device 10 is a game device for executing game software. The input device 6 may be a device for supplying the user operation information to the information processing device 10, such as a game controller or the like. The user logs in to an OS (system software) of the information processing device 10 to play a game. The user who logs in to the system software is managed by a user account registered in the information processing device 10.

The network server 5 is maintained and managed by an entity that operates the information processing system 1. The network server 5 provides the network service of games to the user of the information processing system 1. The network server 5 manages a network account identifying the user. The user signs in to the network service provided by the network server 5 using the network account. By signing in to the network service from the information processing device 10, the user can purchase digital contents from the store server 16, and receive the digital contents distributed from the content server 12. Incidentally, in the present embodiment, the digital contents may be AV data such as application software, movies, and the like. However, the following description will be made particularly of a case where the digital contents are game software.

An auxiliary storage device 2 is a mass storage device such as an HDD (Hard Disk Drive), a flash memory, or the like. The auxiliary storage device 2 may be an external storage device connected to the information processing device 10 by a USB (Universal Serial Bus) or the like, or may be an internal storage device. The output device 4 may be a television set including a display for outputting an image and a speaker for outputting sound, or may be a computer display. The output device 4 may be connected to the information processing device 10 by a wire cable, or may be connected to the information processing device 10 by radio.

The input device 6 includes a plurality of input portions such as a plurality of push type operating buttons, an analog stick allowing an analog quantity to be input, a rotation type button, and the like. A camera 7 as an imaging device is provided in the vicinity of the output device 4. The camera 7 images a space around the output device 4. FIG. 1 shows an example in which the camera 7 is attached to an upper portion of the output device 4. However, the camera 7 may be disposed on the side of the output device 4. In either case, the camera 7 is disposed in such a position as to be able to image the user playing a game in front of the output device 4. The information processing device 10 has a function of face authentication of the user from an image imaged by the camera 7.

Figure 2:
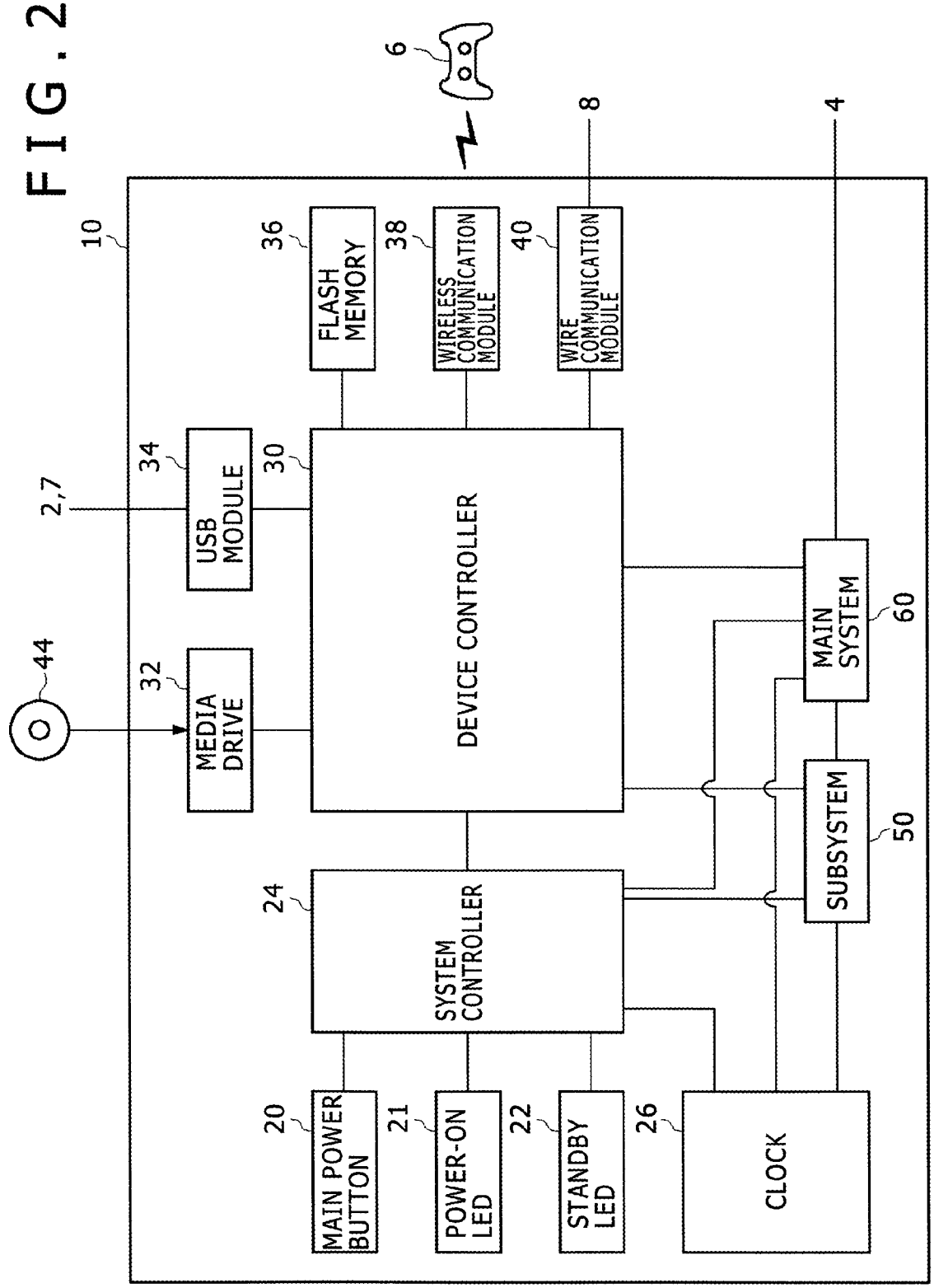
FIG. 2 is a functional block diagram of an information processing device.

FIG. 2 is a functional block diagram of the information processing device 10. The information processing device 10 includes a main power button 20, a power-on LED 21, a standby LED 22, a system controller 24, a clock 26, a device controller 30, a media drive 32, a USB module 34, a flash memory 36, a wireless communication module 38, a wire communication module 40, a subsystem 50, and a main system 60.

The main system 60 includes a main CPU (Central Processing Unit). The subsystem 50 includes a sub-CPU. The sub-CPU maintains an active state even while the main CPU is in a standby state. While the main power of the information processing device 10 is on, the main CPU performs various kinds of processing such as the execution of an application and the like under an environment created by system software. When the main power of the information processing device 10 is turned off, on the other hand, the sub-CPU performs download processing and the like.

The main power button 20 is an input portion where operating input from the user is performed. The main power button 20 is provided to a front surface of a casing of the information processing device 10. The main power button 20 is operated to turn on or off the supply of power to the main system 60 of the information processing device 10. Hereinafter, the on state of the main power supply means that the main system 60 is in an active state, and the off state of the main power supply means that the main system 60 is in a standby state. The power-on LED 21 is lit when the main power button 20 is turned on. The standby LED 22 is lit when the main power button 20 is turned off.

The system controller 24 detects the depression of the main power button 20 by the user. When the main power button 20 is depressed while the main power supply is in an off state, the system controller 24 obtains the depressing operation as a "turn-on instruction." When the main power button 20 is depressed while the main power supply is in an on state, on the other hand, the system controller 24 obtains the depressing operation as a "turn-off instruction."

The main CPU has a function of executing a game program installed in the auxiliary storage device 2 or on a ROM medium 44. On the other hand, the sub-CPU does not have such a function. However, while the main CPU is in a stand-by state, the sub-CPU has a function of accessing the auxiliary storage device 2 and a function of transmitting and receiving information to and from the network server 5. The sub-CPU is configured to have only such limited processing functions. The sub-CPU can therefore operate with low power consumption as compared with the main CPU.

The clock 26 is a real-time clock. The clock 26 generates present date and time information, and supplies the present date and time information to the system controller 24, the subsystem 50, and the main system 60.

The device controller 30 is configured as an LSI (Large-Scale Integrated Circuit) that transfers information between devices like a Southbridge. As shown in the figure, the device controller 30 is connected with devices such as the system controller 24, the media drive 32, the USB module 34, the flash memory 36, the wireless communication module 38, the wire communication module 40, the subsystem 50, the main system 60, and the like. The device controller 30 accommodates differences between electrical characteristics of the respective devices and differences between data transfer rates, and controls data transfer timing.

The media drive 32 is a drive device that is loaded with the ROM medium 44 on which application software such as a game or the like and license information are recorded, drives the ROM medium 44, and reads a program, data, and the like from the ROM medium 44. In the following, programs and data may be referred to collectively as data when the programs and the data are not particularly distinguished from each other. However, data will be used also to represent elements constituting files. The ROM medium 44 is a read-only recording medium such as an optical disk, a magneto-optical disk, a Blu-ray disk, or the like.

The USB module 34 is a module connected to an external device by a USB cable. The USB module 34 may be connected to the auxiliary storage device 2 and the camera 7 by a USB cable. The flash memory 36 is an auxiliary storage device forming an internal storage. The wireless communication module 38 performs wireless communication with the input device 6, for example, under a communication protocol such as a Bluetooth (registered trademark) protocol, an IEEE 802.11 protocol, or the like. Incidentally, the wireless communication module 38 may support a third-generation (3rd Generation) digital mobile telephone system compliant with an IMT-2000 (International Mobile Telecommunication 2000) standard defined by the ITU (International Telecommunication Union), or may further support a digital mobile telephone system of another generation. The wire communication module 40 performs wire communication with an external device. The wire communication module 40 is connected to the network 3 via the AP 8, for example.

The main system 60 includes the main CPU, a memory as a main storage device and a memory controller, a GPU (Graphics Processing Unit), and the like. The GPU is used mainly for arithmetic processing of a game program. These functions may be configured as a system on chip, and formed on one chip. The main CPU has a function of starting the system software, and executing an application installed in the auxiliary storage device 2 under an environment provided by the system software.

The subsystem 50 includes the sub-CPU, a memory as a main storage device and a memory controller, and the like, but does not include a GPU. The number of circuit gates of the sub-CPU is smaller than the number of circuit gates of the main CPU. The operation power consumption of the sub-CPU is lower than the operation power consumption of the main CPU. As described above, the sub-CPU operates while the main CPU is in a standby state, and the processing functions of the sub-CPU are limited to reduce the power consumption of the sub-CPU. Incidentally, the sub-CPU and the memory may be formed on another chip.

Returning to FIG. 1, the content server 12 provides game software as digital contents to the information processing device 10. The game software includes a startup file, a resource file group for executing a game such as a game program or the like, and a file group used by the system software of the information processing device 10. The game program is necessary to execute the game. The game progresses by running the game program. The startup file is a program for starting the game program. When the startup file is executed, the game program is called up and executed. The file group used by the system software includes for example a game icon image to be displayed on a menu screen in the information processing device 10.

The content server 12 can also provide a patch to be applied to the game to the information processing device 10. The patch includes a game program in which bugs are fixed, a data file for changing game functions, and the like. The patch has a same file configuration as the game software, and includes a file to be substituted for a file included in the game software.

Thus, when the information processing device 10 installs both of the game software and the patch in the auxiliary storage device 2, and both of the game software and the patch include a file having a same name, the information processing device 10 executes the game using the file included in the patch. Incidentally, the game software and the patch are stored in separate directories in the information processing device 10, and the file of the game software is not overwritten with the file of the patch. Incidentally, when the information processing device 10 has downloaded a plurality of versions of the patch, the file of a newest version of the patch is used. The game is thereby executed in a newest state.

The information processing device 10 according to the present embodiment realizes effective installation processing, and provides a mechanism that enables the user to play the game immediately. One usage situation is a case where the information processing device 10 downloads the game software from the content server 12 to the auxiliary storage device 2. Another usage situation is a case where the information processing device 10 copies the game software from the ROM medium 44 loaded in the media drive 32 to the auxiliary storage device 2 while executing the game using files recorded on the ROM medium 44. In the latter usage situation, the information processing device 10 makes the game progress while copying the files recorded on the ROM medium 44 to the auxiliary storage device 2 as appropriate, and using files copied in the auxiliary storage device 2 when the data necessary to execute the game is present in the auxiliary storage device 2 and using the data recorded on the ROM medium 44 when the data is not present in the auxiliary storage device 2. The operation of the information processing device 10 in each of the usage situations will be described in the following. However, repeated description will not be made of operation and contents common to both of the situations.

<Downloading Game Software from Server>

The game software includes a startup file, a resource file group for executing a game such as a game program or the like, and a file group used by the system software of the information processing device 10. The game software according to the present embodiment is packaged software as a unit for sale or distribution. In the information processing system 1, there is game software downloaded from the content server 12 to the information processing device 10 via the network 3, and there is game software supplied from the ROM medium 44 to the information processing device 10. Both pieces of game software have an identical directory structure, and the respective directories of the pieces of game software have identical files. When the directory structures and the files included in the directories are thus made identical, it suffices for a game developing manufacturer to manufacture one kind of game software not dependent on a sales or distribution form, therefore providing an advantage of being able to reduce the burden of development cost.

The game software has a tree type directory structure. A root directory at a highest level includes the startup file. Subdirectories at a lower level are classified by file type. For example, a subdirectory for a 3D model, a subdirectory for texture, a subdirectory for a script, and the like are formed as the subdirectories. Each subdirectory includes corresponding files. The subdirectory for the 3D model includes a plurality of 3D model files. The subdirectory for texture includes a plurality of texture files. The subdirectory for the script includes a plurality of script files. For example, the subdirectory for texture includes a texture file for scene 1 of the game, a texture file for scene 2 of the game, a texture file for scene 3 of the game, and the like.

Figure 3:
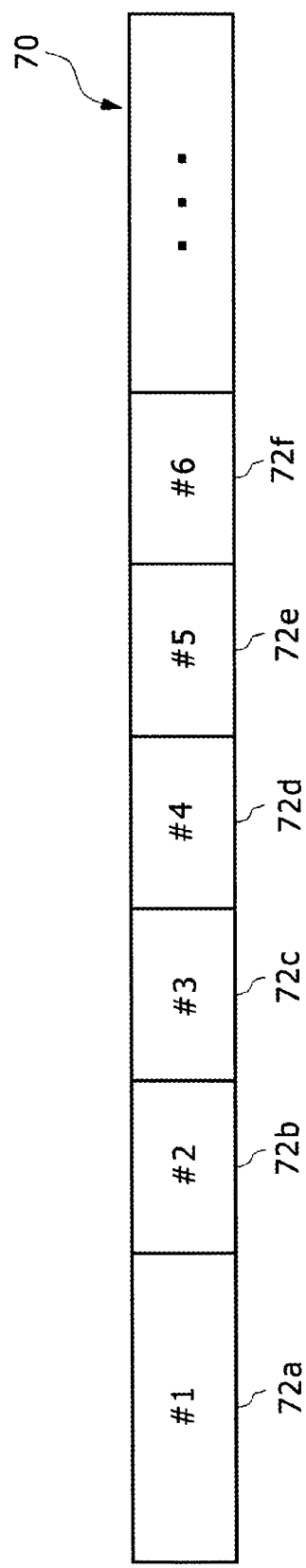
FIG. 3 is a diagram showing a configuration of game software.

FIG. 3 shows a configuration of the game software. Game software 70 according to the present embodiment is formed by a plurality of files, and is logically divided into a plurality of groups 72, as shown in the figure. Each file belongs to at least one of the plurality of groups 72, and at least one file belongs to each group 72. The game software 70 shown in FIG. 3 includes a first group 72*a* as a front group, and a second group 72*b*, a third group 72*c*, a fourth group 72*d*, a fifth group 72*e*, and a sixth group 72*f* as groups following the first group 72*a*. Incidentally, there may be a seventh and subsequent groups 72 following the sixth group 72*f*. Each group is identified by a group number such as the first, the second, or the like.

As already described, the game software 70 has a tree type directory structure. The directory structure has a plurality of subdirectories formed for each file type. The files included in the plurality of subdirectories belong to the respective groups that are divided logically. That is, each group is formed by files of different types, and is set such that files necessary for the information processing device 10 to execute a particular unit such as a scene, a stage, or the like in the game belong to each group. Incidentally, groups for languages to be described later are used for scenes in the game, and files necessary to execute a particular unit do not necessarily need to belong to the groups for the languages.

A program file and a data file necessary to start the game software 70 belong to the first group 72*a*. Hence, when the information processing device 10 has downloaded all of the files belonging to the first group 72*a*, the information processing device 10 can immediately start the game software 70 even if the information processing device 10 has not downloaded the files of the following second group 72*b* and the subsequent groups. Incidentally, after the information processing device 10 has obtained all of the files belonging to the first group 72*a* and started the game software 70, the information processing device 10 downloads the files belonging to the following groups 72 in the background. The download waiting time of the user can be shortened by thus making a minimum of files necessary to execute the game downloaded first and allowing the game to be executed at a point in time that these files are obtained.

Figure 4:
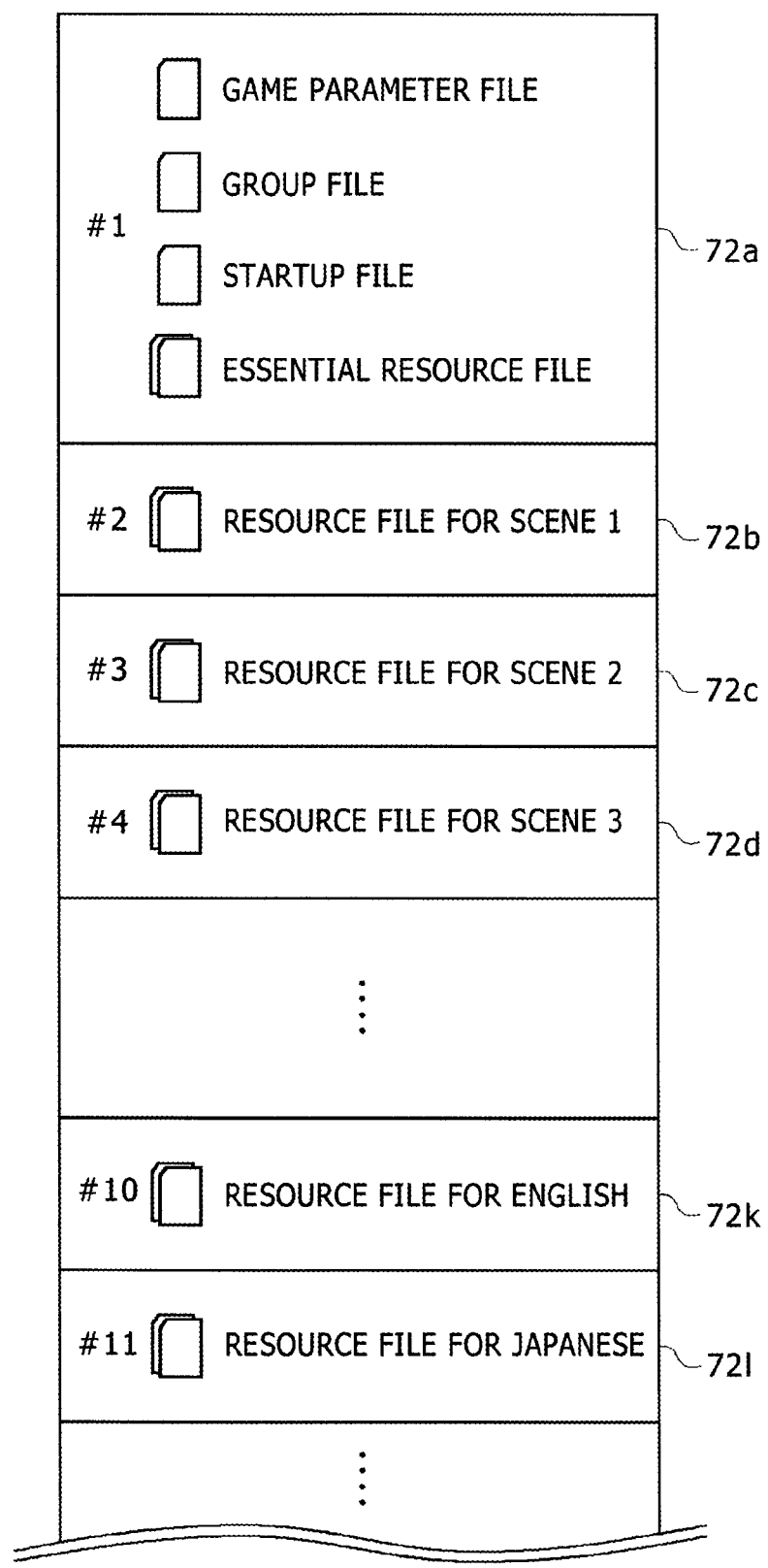
FIG. 4 is a diagram showing a concrete example of the configuration of the game software.

FIG. 4 shows a concrete example of configuration of the game software. The first group 72*a* is formed by a file group to be downloaded first in the game software 70. In this case, a game parameter file, a group file, a startup file, and an essential resource file are shown as the first group 72*a*.

Here, the game parameter file is used by the system software of the information processing device 10. The game parameter file includes for example information such as a title ID, a display resolution, and the like, icon image data, and the like.

The group file is a definition file describing in which group each file is included. For example, the group file may be represented in XML. However, the group file may be represented in another program language in any form. The group file will be described later with reference to FIG. 5 and FIG. 6.

The startup file is a program for starting the game program. The essential resource file includes a resource file such as a program essential for the execution of the game or the like, a common file used in the whole of the game, and the like.

The information processing device 10 can start the game when obtaining all of the file group belonging to the first group 72*a*. Conversely, the first group 72*a* includes a file group necessary for the user to play a part of the game. Incidentally, the game play in this case may also include a setting action performed at a time of a start of the game, such for example as determination of a character or determination of a game level by the user. That is, the first group 72*a* includes a file group necessary to start the game and allow the user to perform at least some operation. The game play that can be performed using the file group included in the first group 72*a* may be for example only an initial setting for the game or such that up to a first stage of the game can be played. This depends on the game manufacturer.

In the example shown in FIG. 4, a plurality of resource files for scene 1 belong to the second group 72*b*, a plurality of resource files for scene 2 belong to the third group 72*c*, and a plurality of resource files for scene 3 belong to the fourth group 72*d*. Specifically, the plurality of resource files are 3D model files, texture files, script files, and the like for the particular scenes, and include files included in the plurality of subdirectories of the directory structure. In addition, resource files for English belong to a tenth group 72*k*, and resource files for Japanese belong to an eleventh group 72*l*.

Many of recent games are created so as to be executable in a plurality of countries of different languages. Audio data and image data are created so as to correspond to a plurality of languages, and audio files and image files for the plurality of languages are included in one piece of packaged software. Such files may hereinafter be referred to as "language-dependent" files. The audio files and the image files basically tend to have a large data size. The data size of such language-dependent files may account for a considerable proportion of the data size of the whole of the game software. Accordingly, the game software 70 according to the present embodiment includes groups of resource files for languages in which groups audio files and image files are collected on a language-by-language basis, in order that only necessary language-dependent files can be obtained.

Figure 5:
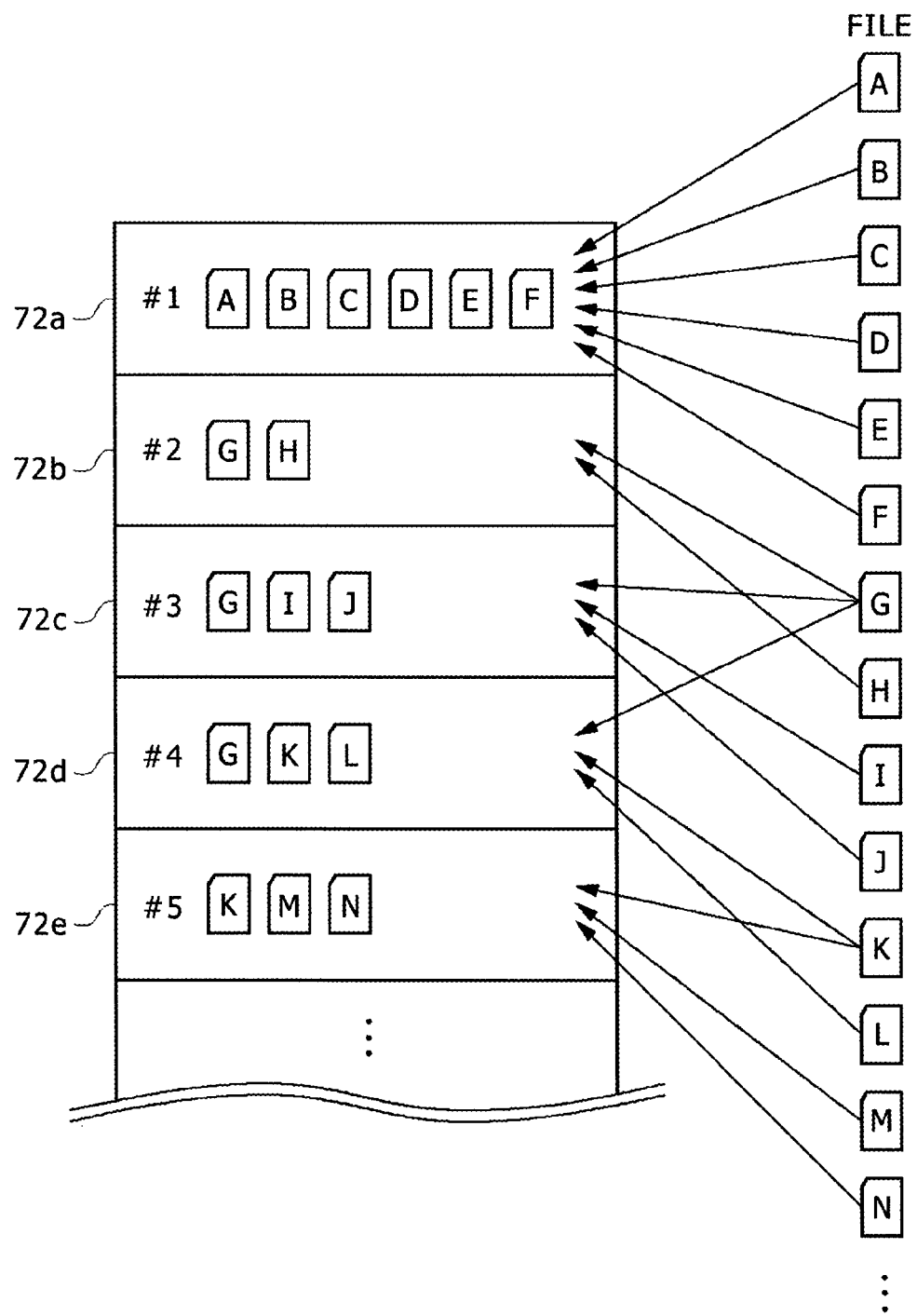
FIG. 5 is a diagram showing an example of relation between groups and files.

FIG. 5 shows an example of relation between groups and files. In this case, files A to N are shown belonging to respective groups 72. As shown in the figure, each file belongs to at least one of a plurality of groups 72, and at least one file belongs to each group 72. Incidentally, the file G belongs to the second group 72*b*, the third group 72*c*, and the fourth group 72*d*. This means that the file G is necessary to form scene 1, scene 2, and scene 3 in the game. One file may thus belong to a plurality of groups. Incidentally, the file K also belongs to a plurality of groups 72, that is, the fourth group 72*d* and the fifth group 72*e*.

Figure 6:
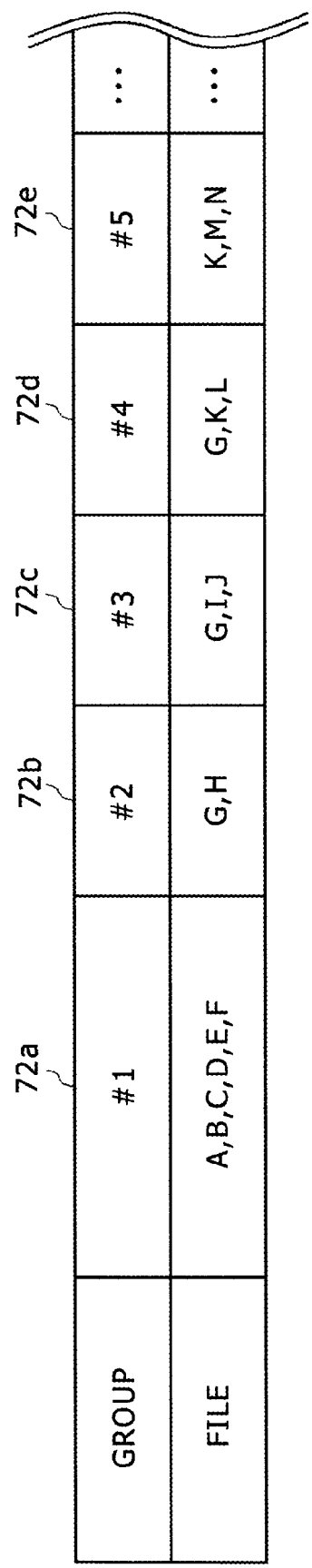
FIG. 6 is a diagram showing an example of a group file.

FIG. 6 shows an example of a group file. As described above, the group file may be represented in XML, or may be represented in another program language. FIG. 6 shows a group file representing correspondence relation between groups and files in a table format to facilitate understanding. When the information processing device 10 downloads each file of the game software 70, the information processing device 10 can determine whether all files belonging to a certain group are obtained or not obtained by referring to the group file. For example, as for the first group 72a, the information processing device 10 can recognize that the files belonging to the first group 72a are files A, B, C, D, E, and F by referring to the group file. Thus, when these files are recorded in the auxiliary storage device 2, the information processing device 10 determines that all of the files belonging to the first group 72a are obtained.

Figure 7:
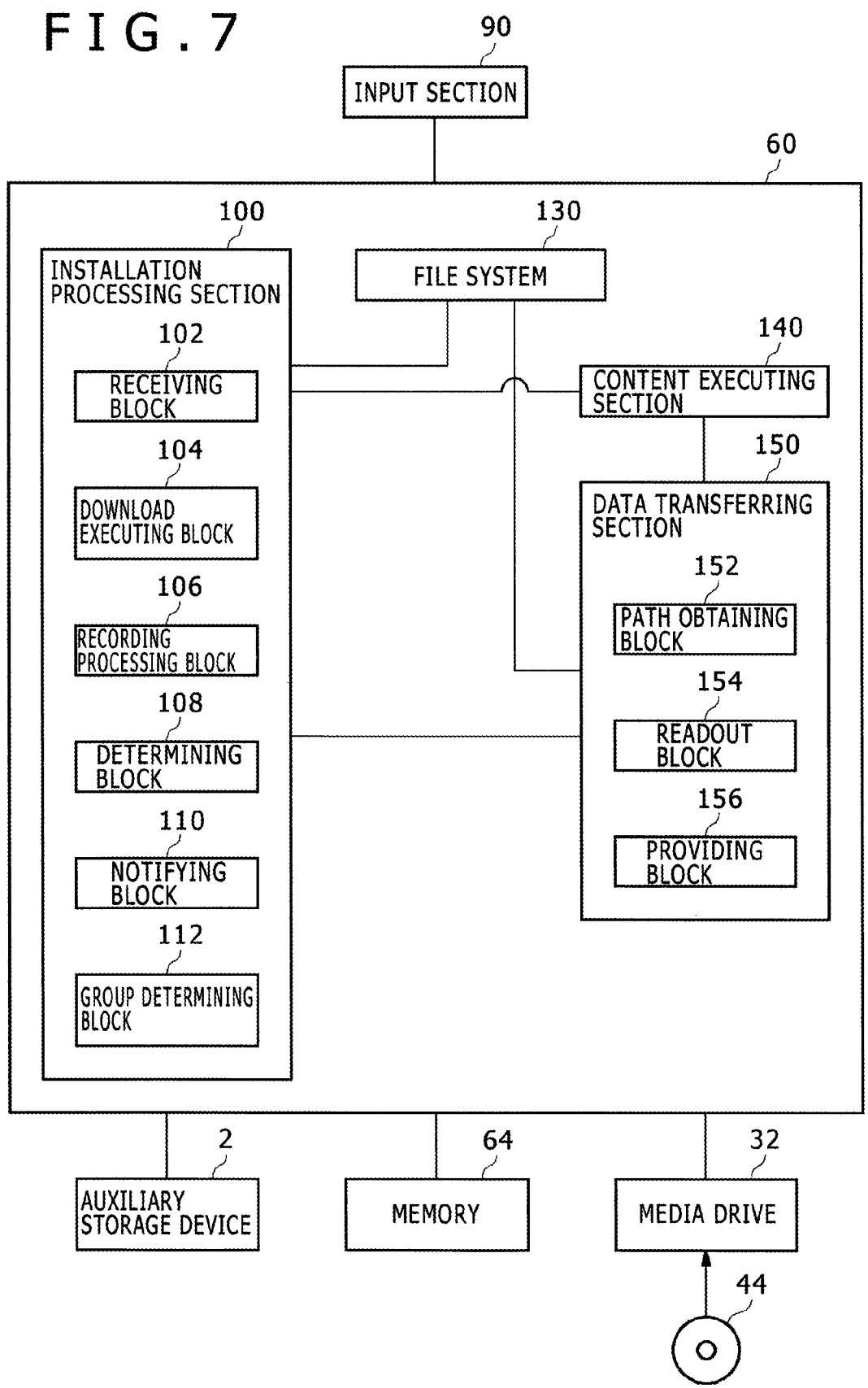
FIG. 7 is a diagram showing functional blocks for performing download processing and copy processing in the information processing device.

FIG. 7 shows functional blocks for performing download processing and copy processing in the information processing device 10. In the present embodiment, the download processing obtains (downloads) the game software from the content server 12, and installs the game software in the auxiliary storage device 2. The copy processing copies (installs) the game software recorded on the ROM medium 44 into the auxiliary storage device 2. Therefore, the download processing and the copy processing may be referred to collectively as installation processing in the present embodiment.

The information processing device 10 includes an input section 90, the main system 60, the auxiliary storage device 2, a memory 64, and the media drive 32. These configurations are implemented, in terms of hardware components, by the CPU of an arbitrary computer, a memory, a program loaded in the memory, a storage, and the like. In this case, however, the functional blocks implemented by cooperation of these components are depicted. Hence, it is to be understood by those skilled in the art that these functional blocks can be implemented in various forms by only hardware, only software, or a combination of hardware and software.

The auxiliary storage device 2 is for example an HDD or a flash memory. The media drive 32 is loaded with a recording medium such as the ROM medium 44 or the like, and is able to read out data from the recording medium. Incidentally, the recording medium loaded into the media drive 32 is not limited to the ROM medium 44. A comparison between the data readout speed of the auxiliary storage device 2 and the data readout speed of the media drive 32 in the information processing device 10 shows that the data readout speed of the auxiliary storage device 2 is higher than the data readout speed of the media drive 32. In this sense, in the present embodiment, the auxiliary storage device 2 may be referred to as a high-speed device, and the media drive 32 may be referred to as a low-speed device. The input section 90 receives operation information indicating an operation of the input device 6 by the user, and provides the operation information to a receiving block 102.

The main system 60 includes an installation processing section 100, a file system 130, a content executing section 140, and a data transferring section 150. The file system 130 manages files recorded in the auxiliary storage device 2, in the flash memory 36, and on the ROM medium 44, and further manages on which medium data included in the files is recorded, or specifically manages locations of the auxiliary storage device 2, the flash memory 36, and the ROM medium 44 at which locations the data is recorded. The file management function of the file system 130 is implemented by a kernel layer of the system software, utility software, or the like.

The installation processing section 100 has a function of performing game software download processing and copy processing, and recording the files of the game software in the auxiliary storage device 2. The installation processing section 100 includes a receiving block 102, a download executing block 104, a recording processing block 106, a determining block 108, a notifying block 110, and a group determining block 112. The content executing section 140 executes digital contents assuming that license information is present. The content executing section 140 in the present embodiment executes the game software. The license information is provided by the store server 16 at a time of purchase, and is recorded in the auxiliary storage device 2 or the flash memory 36. The data transferring section 150 performs data transfer processing. The data transferring section 150 includes a path obtaining block 152, a readout block 154, and a providing block 156.

In the game software download processing, the auxiliary storage device 2 is used as a storage device for storing a plurality of files constituting the game software. In the game software, each file belongs to at least one group, and at least one file belongs to each group. The download processing is performed in group units. For example, when files X, Y, and Z belong to a group S, and a request to download the group S is generated, the files X, Y, and Z are downloaded from the content server 12, and all of the files X, Y, and Z belonging to the group S are recorded in the auxiliary storage device 2. Incidentally, when the file X is already downloaded, the files Y and Z are downloaded from the content server 12. All of the files X, Y, and Z belonging to the group S are thereby recorded in the auxiliary storage device 2.

In game software purchase processing, the system software receives the address of a game software sales page from the store server 16, and makes the sales page displayed on the display of the output device 4. When the user selects desired game software by operating the input device 6, charging processing is performed to give the license information to the information processing device 10, and download information including game identifying information (title ID) identifying the selected game software is transmitted to the content server 12, so that the content server 12 is ready to distribute the files of the game software specified by the game identifying information to the information processing device 10.

In the installation processing section 100, the group determining block 112 determines a group of the game software to be downloaded by the download executing block 104. When starting download processing for downloading new game software, the group determining block 112 determines the first group 72a as a group to be downloaded first. The download executing block 104 has a function of downloading and obtaining the game software from the content server 12 connected to the network 3. Specifically, the download executing block 104 transmits a download request including information (group identifying information) identifying the group determined by the group determining block 112 to the content server 12, and downloads files included in the group.

As shown in FIG. 3, the groups of the game software can be identified by group numbers. The group numbers are set in descending order from one. As a method for determining groups, the group determining block 112 may set the order of the groups to be downloaded as the same as group number order. Specifically, the group determining block 112 may determine a group of a smaller number as an object to be downloaded earlier, and thus determine that the first group 72a, the second group 72b, the third group 72c, . . . are to be downloaded in the group number order. After the group determining block 112 determines the order of the groups to be downloaded, the group determining block 112 notifies the order to the download executing block 104. The download executing block 104 downloads the files included in the groups according to the order.

After the group determining block 112 determines the first group 72a as the group to be downloaded first, the download executing block 104 transmits a download request including information identifying the first group 72a to the content server 12. The content server 12 identifies the files included in the first group 72a by referring to the group file of the game software requested to be downloaded. As shown in FIG. 6, the first group 72a includes files A, B, C, D, E, and F. The content server 12 distributes the files A, B, C, D, E, and F to the information processing device 10 in order. After the download executing block 104 receives the files A, B, C, D, E, and F, the recording processing block 106 records the files A, B, C, D, E, and F in the auxiliary storage device 2.

The determining block 108 determines whether files are recorded in the auxiliary storage device 2 in group units. The correspondence relation between groups and files is described in the group file. Thus, after the group file is recorded in the auxiliary storage device 2, the determining block 108 determines whether all of files belonging to a group are recorded in the auxiliary storage device 2 by referring to the group file. Incidentally, after downloading the files of the first group 72a, the information processing device 10 according to the present embodiment can start the game without waiting for the files of the following groups being downloaded. However, during the execution of the game, the notifying block 110 notifies the content executing section 140 of identifying information identifying a group whose files are all recorded in the auxiliary storage device 2. This group identifying information is passed to the game, whereby the game can be informed that the files of the group can be used. When the files included in the group are not downloaded yet, on the other hand, the game can be informed that the files of the group cannot be used. When the files of the group cannot be used, the game cannot represent the scene using the files of the group. The game therefore responds so as not to interrupt the progress of the game suddenly by waiting until the files of the group are downloaded while displaying the previous scene from the output device 4.

During the download of the files included in the first group 72a, the download executing block 104 may display download progress conditions in the form of a progress bar on the display.

FIG. 8 shows an example of the download conditions displayed on the display. FIG. 8 shows that game software having a game title "TENNIS4" is being download, and that 0.8 gigabytes (GB) of data out of 2 GB is already downloaded. The download progress conditions displayed in this case do not represent the progress conditions of all of files constituting TENNIS4, but merely represent the download progress conditions of the files belonging to the first group 72a. Hence, in the example shown in FIG. 8, the data size of the files belonging to the first group 72a is 2 GB, 0.8 GB out of the 2 GB is already downloaded, and the remaining data can be downloaded in two minutes.

As described above, the first group 72a includes a minimum file group necessary to start the game. Therefore, when the file group of the first group 72a is recorded in the auxiliary storage device 2, the user is able to start the game. The download executing block 104 accordingly informs the user that the user does not need to wait for a long time by displaying a download remaining time before the user becomes able to start the game and the progress conditions on the display.

After the download executing block 104 has completed the download of the files included in the first group 72a, the download executing block 104 continues the download processing to next download the files included in the second group 72b. At this time, the download of the following group is performed in the background. The progress conditions of the download of the following group therefore do not need to be displayed on the display.

On the other hand, the user may want to check the download conditions of the following group. Accordingly, the download executing block 104 may display the download progress conditions of the following group in the form of a progress bar on the display. For example, the download progress conditions of the following group may be displayed in an edge portion of the display, or the download progress conditions may be displayed in the center of the display as shown in FIG. 8 when the user makes a check request. At this time, the download executing block 104 may display progress conditions such that a total data size of data from the second group to the last group and the data size of downloaded data included in these groups can be compared with each other, or may display progress conditions such that a total data size of the game software 70 and the total data size of the downloaded data can be compared with each other.

The determining block 108 determines whether all of the files belonging to the first group 72a are recorded in the auxiliary storage device 2 during the execution of the download processing by the download executing block 104. When the determining block 108 determines that all of the files belonging to the first group 72a are recorded in the auxiliary storage device 2, the notifying block 110 notifies the content executing section 140 of that effect. The content executing section 140 thereby recognizes that the game title "TENNIS4" can be started, and displays the icon of "TENNIS4" on a menu screen such that the icon of "TENNIS4" is selectable by the user. When the user makes a determination by selecting the icon of "TENNIS4" on the menu screen, the content executing section 140 starts "TENNIS4," so that the user can play "TENNIS4." Incidentally, while the user starts the game and is playing the game, the download executing block 104 continues the download processing in the background. Therefore, when the user has ended the game provided by the first group 72a, for example, the files belonging to the group of a next scenario (for example the second group 72b) are recorded in the auxiliary storage device 2. The game software can thus make the game progress using the files belonging to the second group 72b. Incidentally, when the notifying block 110 has not notified the game that all of the files belonging to the second group 72b are recorded in the auxiliary storage device 2, the game may continue displaying a game execution screen that can be represented by the files of the first group 72a on the display until the game is notified that the download of the second group 72b is completed. Because the game thus waits for the completion of the download of the second group 72b, a smooth game progress is realized.

Incidentally, the icon of the game software may be displayed in different modes according to download statuses. Specifically, there are four kinds of download statuses, that is, a status before a start of download, a status during the download of the first group, a status of an end of the download of the first group, and a status of an end of the download of all of the groups. A status during the download of the following groups may be added to these statuses. When the display mode of the icon is changed according to these statuses, the user can check download conditions by merely viewing the icon. Incidentally, the status before the start of the download is a state in which the user has purchased the game software from the store, but has not yet started downloading the game software. Hence, before the start of the download, the icon prepared by the system software is displayed together with the game title.

Incidentally, while the content executing section 140 may execute the game software on receiving an instruction (icon operation) from the user as described above, the content executing section 140 may execute the game software without the instruction from the user. When the game software is automatically started without the instruction from the user, it is not necessary to present the menu screen to the user, so that the user can be naturally led into the world of the game.

The file system 130 manages the recording conditions of the auxiliary storage device 2, or specifically manages files recorded in the auxiliary storage device 2. Therefore, the determining block 108 can be informed of the recording conditions of files belonging to a group by inquiring of the file system 130 which files are recorded.

Incidentally, when the content executing section 140 requests the data transferring section 150 to obtain data necessary to execute the contents, the data transferring section 150 obtains the path information of the data in the auxiliary storage device 2 from the file system 130, accesses the auxiliary storage device 2, reads out the data from the auxiliary storage device 2, and provides the data to the content executing section 140. Specifically, the path obtaining block 152 obtains the path information from the file system 130, the readout block 154 reads out the data from the auxiliary storage device 2 according to the path information, and the providing block 156 provides the read-out data to the game software via the content executing section 140. The file system 130 according to the present embodiment has a function of managing whether the data is present in the auxiliary storage device 2 or on the ROM medium 44, and providing proper path information to the data transferring section 150. The function will be described later.

The download executing block 104 thus downloads files one after another according to the order determined by the group determining block 112. The recording processing block 106 records the files in the auxiliary storage device 2. The file system 130 manages the files recorded in the auxiliary storage device 2. The determining block 108 determines, in group units, whether all of files included in a group are recorded in the auxiliary storage device 2, according to file information managed by the file system 130. The download processing is ended when all of the files constituting the game software 70 are recorded in the auxiliary storage device 2.

Incidentally, in the above-described example, the group determining block 112 may set the order of the groups to be downloaded as the same as group number order. However, the order of the groups to be downloaded may be described in an order definition file, and the group determining block 112 may determine the order of the groups to be downloaded according to the order definition file. The order definition file is included in the first group 72a. Hence, after the order definition file is downloaded, the group determining block 112 can determine the order of download of the following groups by referring to the download order included in the order definition file. This order definition file may set the same download order as the group number order. However, the order definition file may also set a plurality of kinds of download order that branch according to the progress conditions of the game. For example, when routes are prepared in which the user proceeds to scene (P+1) or scene Q after scene P of the game according to a selection by the user during the game, the download order may be set so as to branch into download order from a group constituting scene P to a group constituting scene (P+1) and groups following scene (P+1) and download order from the group constituting scene P to a group constituting scene Q and groups following scene Q.

Incidentally, referring to FIG. 5 and FIG. 6, there are cases where one file belongs to a plurality of groups, as with the file G and the file K, for example. As for the file G, when the file G has been downloaded in the auxiliary storage device 2 in the download processing of the second group 72b, for example, the file G does not need to be downloaded again at times of download processing of the third group 72c and the fourth group 72d.

Accordingly, after downloading the files belonging to the first group 72a, the download executing block 104 identifies the files belonging to the following groups by referring to the group file before downloading the files belonging to the following groups, and inquires of the file system 130 whether the identified files are already recorded in the auxiliary storage device 2. When a file is already recorded, it is desirable to exclude the file from download objects, and transmit a download request identifying unrecorded files to the content server 12. Thus, while the download executing block 104 generates a download request specifying the first group 72a at the time of a start of download processing, as for the following groups, the download executing block 104 desirably avoids repeated download of files by generating a download request specifying files not yet downloaded which files belong to the following groups.

Incidentally, the download executing block 104 can also generate a download request specifying the files belonging to the first group 72a at the time of a start of download processing. This requires the download executing block 104 to know the files belonging to the first group 72a. For example, when the download executing block 104 notifies the information of the title ID to the content server 12 prior to the download processing, the content server 12 may return information identifying the files belonging to the first group 72a to the installation processing section 100. The download executing block 104 can thereby grasp the files to be downloaded first. The download executing block 104 can therefore generate the download request specifying the files belonging to the first group 72a at the time of a start of download processing.

In the above-described example, the group determining block 112 determines the order of groups to be downloaded according to the group file or the order definition file included in the first group 72a. However, groups specified by the game software may be determined as groups to be downloaded. When the content executing section 140 executes the game, and the download executing block 104 is performing download processing in the background, the scenario of the game may change according to the progress conditions of the game.

Referring to FIG. 4, the second group 72b includes the resource files for scene 1, the third group 72c includes the resource files for scene 2, and the fourth group 72d includes the resource files for scene 3. When the game progresses from scene 1 to scene 2 to scene 3, the download executing block 104 preferably downloads the second group 72b, the third group 72c, and the fourth group 72d in this order.

However, when the game progresses from scene 1 to scene 3, the resource files for scene 2 do not need to be downloaded before the resource files for scene 3. Accordingly, the game software determines the group that will become necessary soon according to the progress conditions of the game, and transmits group identifying information identifying the group to the group determining block 112.

At this time, the group determining block 112 inquires of the file system 130 whether all of the files belonging to the group are already recorded in the auxiliary storage device 2. When all of the files belonging to the group are already recorded in the auxiliary storage device 2, the group determining block 112 does not change the predetermined download order. When not all of the files belonging to the group are already recorded in the auxiliary storage device 2, the group determining block 112 sets the group as the first in the download order, and notifies the changed download order to the download executing block 104. Thereby the download executing block 104 can preferentially obtain the files belonging to the group according to the group identifying information specified from the game software, thus supporting a smooth progress of the game. Incidentally, whether or not the files belong to the group specified by the game software are already recorded in the auxiliary storage device 2 may be inquired by the download executing block 104. In this case, the group determining block 112 may determine the download order without inquiring of the file system 130, and notify the download order to the download executing block 104, and the download executing block 104 may inquire of the file system 130 whether or not the files belonging to the group located at the front are already recorded according to the new download order.

Incidentally, when the order definition file is included in the first group 72a, the game specifies a group as a branch destination at a branch point of a plurality of set download orders. In the above-described example, the game software determines to which of scene (P+1) and scene Q to proceed after scene P, determines the group as the branch destination according to a result of the determination, and notifies the group as the branch destination to the group determining block 112. Thereby the group determining block 112 can be informed of the route from the branch point. The group determining block 112 determines the download order according to the route, and notifies the download order to the download executing block 104.

Thus, the group determining block 112 can perform efficient download processing according to the progress of the game by receiving a request from the game software and determining the download order again. Even after determining the download order once, the group determining block 112 successively changes the download order appropriately according to a request from the game and the like, and notifies the download order to the download executing block 104, whereby an environment in which the user can play the game comfortably can be realized.

Incidentally, in the installation processing section 100, the receiving block 102 may receive information specifying the download order of groups from the user before a start of download processing, and the download executing block 104 may download the game software according to the received information.

Figure 9:
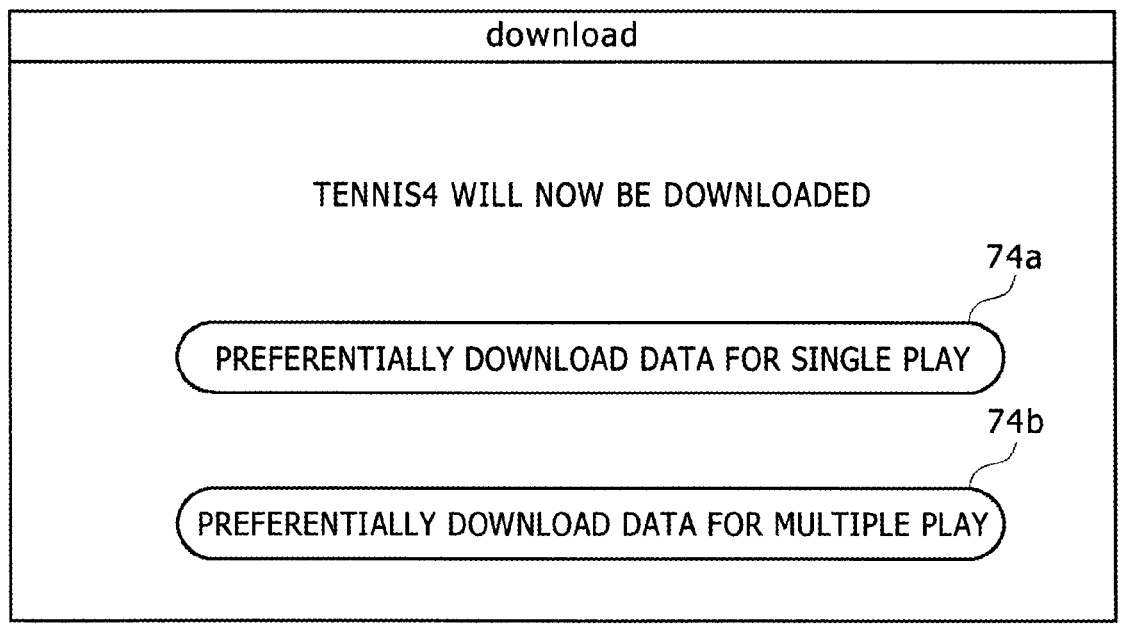
FIG. 9 is a diagram showing an example of a download order selecting screen displayed on the display.

FIG. 9 shows an example of a download order selecting screen displayed on the display. This download order selecting screen is provided by the store server 16. When the user selects the game software to be purchased on a sales page displayed on the display of the output device 4, the download order selecting screen shown in FIG. 9 is displayed via a charging page.

Some game software supports both of single play in which one person plays the game and multiple play in which two people or more play the game. Resource files for single play are different from resource files for multiple play. It is inefficient to download the resource files for multiple play first when the user is going to perform single play from now. Accordingly, the user is allowed to select which resource files to download preferentially, so that the resource files for single play or multiple play which resource files are selected by the user are downloaded immediately after completion of the download of the first group 72a. On the selecting screen shown in FIG. 9, the user selects an option 74a when the user intends to perform single play by himself/herself, and the user selects an option 74b when the user intends to perform multiple play as one of a plurality of persons. When the receiving block 102 receives a selecting operation by the user, the group determining block 112 determines groups to be downloaded according to the selecting operation.

For example, when the resource files for single play belong to groups from a second group to an Mth group, and the resource files for multiple play belong to groups from an (M+1)th group to an Nth group, the group determining block 112 determines groups to be downloaded preferentially according to the selected option 74, and the download executing block 104 performs download processing according to information identifying the determined groups. Specifically, when the option 74a is selected, the download executing block 104 preferentially downloads the groups from the second group to the Mth group after downloading the first group 72a. When the option 74b is selected, the download executing block 104 preferentially downloads the groups from the (M+1)th group to the Nth group after downloading the first group 72a. Incidentally, as already described, it is preferable that while performing the download processing, the download executing block 104 preferentially obtain the files belonging to the groups according to the group identifying information specified from the game software, to support a smooth progress of the game.

Incidentally, when the system software manages the play tendency of the user, for example, the group determining block 112 may determine the groups to be downloaded preferentially on the basis of the play tendency. This play tendency may be represented by user attribute information indicating whether the user prefers single play or multiple play. When the user always performs single play, for example, the group determining block 112 may determine the groups from the second group to the Mth group as the groups to be downloaded preferentially on the basis of the play tendency. The group determining block 112 may count and store the number of times the user has performed single play in the past and the number of times the user has performed multiple play in the past, retain the number of times the user has performed single play in the past and the number of times the user has performed multiple play in the past as user attribute information, and determine the groups to be downloaded preferentially on the basis of the form of play performed a larger number of times.

In addition, game software often include language-dependent files. The language-dependent files are audio data and image data, and may thus account for a considerable proportion of the data size of the whole of the game software. FIG. 4 shows resource files for English and resource files for Japanese. However, resource files for Spanish, resource files for Chinese, and the like are also included in actuality.

Generally, in the information processing device 10, information on a language to be used is set as an initial setting. For example, when the user is a Japanese, Japanese is set as the language to be used. When the user is an American, English is set as the language to be used. Japanese users need resource files for Japanese, but often do not need resource files for English and Spanish.

Accordingly, the group determining block 112 may refer to used language information set in the information processing device 10, set a group corresponding to the used language information as a download object, and exclude groups not corresponding to the used language information from download objects. The download executing block 104 can thereby operate so as to download files belonging to the group corresponding to the language set in the information processing device 10 among the groups set for the plurality of languages, and so as not to download files belonging to the groups not corresponding to the language set in the information processing device 10. This can shorten the download time of the whole of the game software, and avoid wastefully consuming a storage capacity of the auxiliary storage device 2.

Incidentally, a language selecting screen as shown in FIG. 9 may be displayed on the display of the output device 4 at a time of purchase of the game. The language selecting screen allows the user to select a language to be used for the game title. The group determining block 112 may set the group corresponding to the language selected by the user as a download object, and exclude the groups not corresponding to the language selected by the user from download objects. Incidentally, when resource files for another language later become necessary, it suffices for the download executing block 104 to download the resource files for that language at another time. For example, when the user has changed the language used during game play, for example, the group determining block 112 adds the group corresponding to the changed language as a download object.

Incidentally, the above description has been made of downloading a group for one language and not downloading groups for other languages. However, the groups for the other languages may be downloaded after the group for the one language.

Referring to FIG. 4, description will be made of an example of relation between resource files for scenes and language-dependent files. When the game progresses from scene 1 to scene 2 to scene 3, the download executing block 104 preferably downloads the second group 72b, the third group 72c, and the fourth group 72d in this order. When language-dependent files are necessary in any of the scenes, the language-dependent files are preferably downloaded before the scene. For example, when the second group 72b includes language-dependent files for scene 1, and the third group 72c does not include language-dependent files for scene 2, the download executing block 104 downloads the group for the language before the third group 72c. This can create conditions in which the language-dependent files are already downloaded when the game uses the third group 72c.

The user can purchase a plurality of pieces of game software en bloc on the store server 16. In the following, description will be made of a case where three pieces of game software 70a, 70b, and 70c, for example, are purchased.

Figure 10:
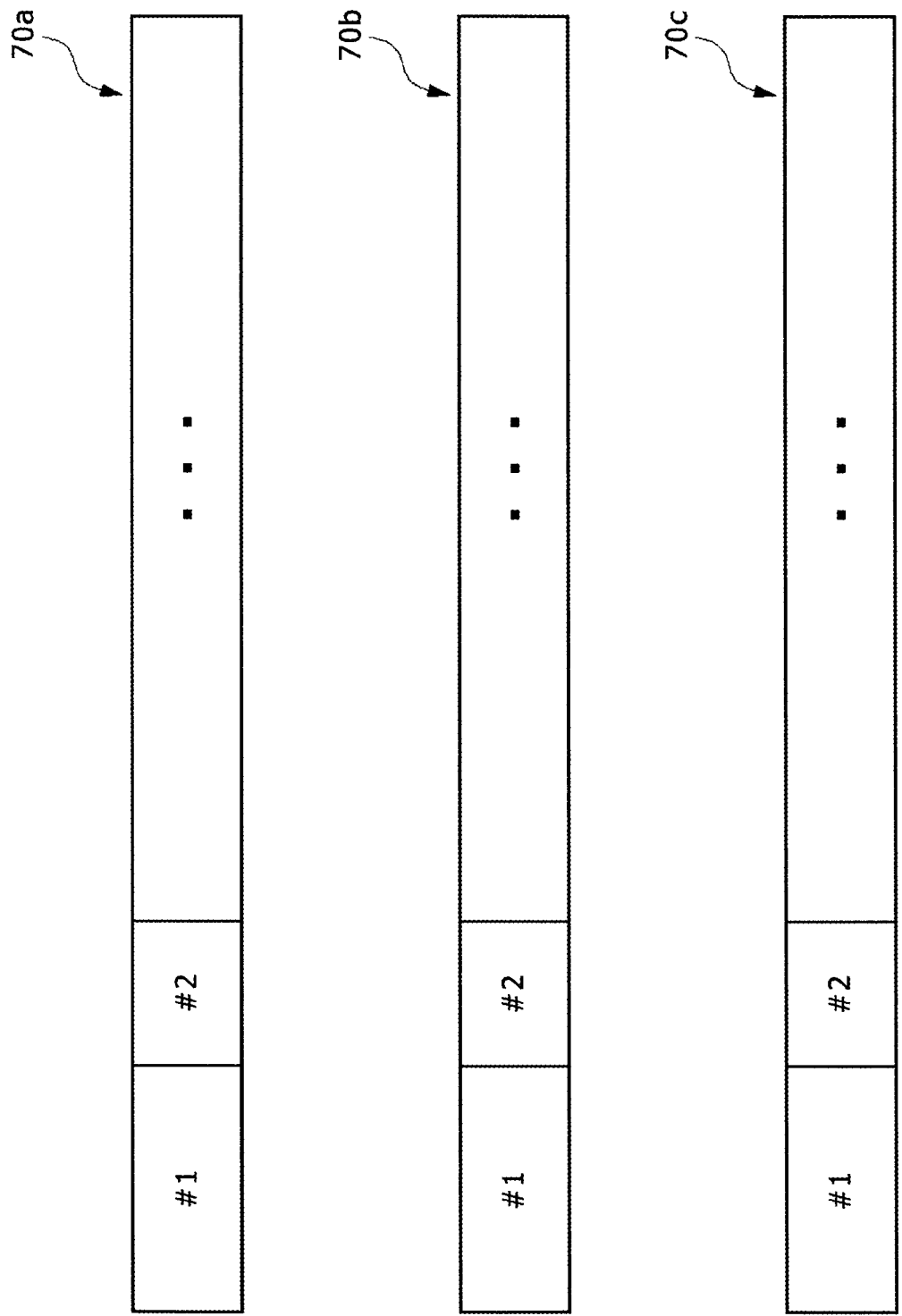
FIG. 10 is a diagram showing configurations of respective pieces of game software.

FIG. 10 shows configurations of the respective pieces of game software 70. The pieces of game software 70a, 70b, and 70c each include a first group and following groups. The group determining block 112 determines the first groups of the respective pieces of game software 70a, 70b, and 70c as objects to be downloaded in this order, for example. After the download executing block 104 has preferentially obtained one or more files belonging to the first group of each group, the group determining block 112 determines the following groups, that is, the second group and subsequent groups, of one of the groups as groups to be downloaded.

When the plurality of pieces of game software are thus determined as download objects, the download executing block 104 preferentially obtains one or more files belonging to the first group of each piece of game software. The download of the files belonging to the first groups of the respective pieces of game software is completed in a relatively short time. Hence, when the download of the first groups of the respective pieces of game software 70a, 70b, and 70c is completed, the user can start one of the games immediately. Incidentally, when one of the games is started, the group determining block 112 preferably determines the following groups of the started game software 70 as groups to be downloaded. When a plurality of pieces of game software thus become download objects, the first groups of the respective pieces of game software are preferably downloaded to make preparations for enabling the user to execute any of the pieces of game software.

Incidentally, the download executing block 104 can also download a plurality of pieces of game software simultaneously in parallel. At this time, the download executing block 104 may display download progress conditions of the first groups of the respective pieces of game software on the display so as to be arranged in the form of progress bars. This enables the user to check the download conditions of the respective pieces of game software at a glance. Incidentally, when the download of the first group of one piece of game software has been completed, the download of the following groups of the game software may be performed next. At this time, the download executing block 104 displays the download progress conditions of the following groups in the form of a progress bar on the display. Incidentally, because the download processing of the first groups of the other pieces of game software has not been completed yet, the download progress conditions of the following groups are preferably different in display form from the download progress conditions of the first groups of the other pieces of game software. For example, the progress bar indicating the download conditions of the following groups may be represented in a different color from the progress bars indicating the download conditions of the first groups. In any case, the progress bars are preferably represented in display forms that enable the user to distinguish the download progress conditions of the first groups from the download progress conditions of the following groups.

In the information processing system 1 according to the present embodiment, the content server 12 can also provide a patch to be applied to the game to the information processing device 10. The patch has a same file configuration as the game software, and includes a file to be substituted for a file included in the game software. That is, the patch also has a group configuration similar to that of the game software 70 shown in FIG. 3.

When the game software 70 is already downloaded in the auxiliary storage device 2, and the installation processing section 100 detects that there is a patch in the content server 12, the group determining block 112 identifies the group of the patch that needs to be downloaded, and the download executing block 104 downloads a file belonging to the identified group of the patch.

Incidentally, a patch may be already prepared on the content server 12 when the game software 70 is downloaded. In this case, the download executing block 104 first downloads the first group 72a of the game software 70. The group determining block 112 thereafter determines a file belonging to the first group of the patch as an object to be downloaded. That is, after the L-group of the game software is downloaded, the L-group of the corresponding patch is downloaded, so that the game software and the patch are downloaded as a set. Thus, by immediately applying the patch to the group of the downloaded game software, the file belonging to the group can be immediately used for the progress of the game.

Incidentally, the determining block 108 may determine whether or not a patch is applied in group units. The notifying block 110 notifies the game of patch application information indicating whether or not a patch is applied. When the game has ended the processing of the file of a group to which a patch is applied, and proceeds to the processing of the file of a next group, the game next determines whether a patch is applied to the group by referring to the notified patch application information. At this time, when the patch is not applied, the game makes the group determining block 112 specify the patch of the next group as a download object. The download executing block 104 can thereby download the file of the patch of the next group preferentially. It is thereby possible to apply the patch to the next group immediately, and thus make the game progress smoothly. Incidentally, when the patch is not applied to the group to be used next, the game responds so as not to interrupt the progress of the game suddenly by waiting until the file of the patch of the group is downloaded while displaying a previous scene on the display.

In the information processing device 10 according to the present embodiment, the file system 130 associates the path of a file with a predetermined virtual mount point (for example "GAME0"). The game software includes, in advance, information identifying the predetermined mount point "GAME0." The game software accesses the file by specifying the mount point. The association of the path of the file with the mount point is managed by the file system 130. The file system 130 performs mount processing that obtains the path of the file of the game in the auxiliary storage device 2 and associates the path with the virtual mount point "GAME0." This enables the game software to access the desired file by merely specifying "GAME0" without needing to specify the actual path of the file. Incidentally, while the path of the file in the auxiliary storage device 2 has been shown here, the paths of files on the ROM medium 44 and in the flash memory 36 are managed similarly.

Specifically, after the file system 130 mounts the game software at a predetermined mount point and generates a virtual game directory, the file system 130 searches for a patch having an identical title ID. When the file system 130 finds the patch, the file system 130 locates a file with which to virtually overwrite the game software from the game directory, and generates the game software virtually overwritten with the file of the patch. It is to be noted that the file system 130 does not actually overwrite the directory of the game software with the file of the patch, but merely generates a virtual game directory as if the game software were overwritten with the patch. By using this virtual game directory, the game software can access a desired file without being aware of whether the accessed file is included in the game software or the patch.

The above description has been made of an example in which game software or a patch is obtained from the content server 12. When all of the files belonging to the first group 72a of the game software 70 distributed from the content server 12 are obtained, the game can be started as a temporary measure. Thus, the user can play the game even when not all of the files of the game software 70 are downloaded. Incidentally, each group of the game software 70 is set such that files necessary to execute a particular unit such as a scene, a stage, or the like in the game belong to each group. Therefore, when the installation processing section 100 determines whether files are recorded in the auxiliary storage device 2 in group units, and notifies a result of the determination to the game, the game can adjust the progress of the game on the basis of the result of the determination, so that a smooth game progress is made possible. In addition, in the information processing device 10 according to the present embodiment, a group managing function is realized by the system software. The game software therefore does not need to have such a function. Thus, a burden of software development on a game manufacturer can be greatly reduced.

In the information processing system 1, routes for the information processing device 10 to obtain the game software include a route by which the game software recorded on the ROM medium 44 is read out, in addition to downloading the game software from the content server 12. The game software recorded on the ROM medium 44 is read out from the media drive 32 to the memory 64 at a relatively low speed as compared with the readout speed of data from the auxiliary storage device 2 to the memory 64. Accordingly, the information processing device 10 according to the present embodiment copies data from the ROM medium 44 to the auxiliary storage device 2 in the background during the execution of the game software, and reads out the data of files that have completed being copied to the auxiliary storage device 2 from the auxiliary storage device 2 rather than from the ROM medium 44, to make high-speed data readout possible. The processing of copying data from the ROM medium 44 to the auxiliary storage device 2 will be described in the following.

<Copying Game Software from Recording Medium to HDD>

Returning to FIG. 7, the media drive 32 is loaded with the ROM medium 44 on which the plurality of files constituting the game software are recorded. The readout block 154 has a function of reading out data recorded on the ROM medium 44 from the media drive 32 to the memory 64. The memory 64 has a role of temporarily storing the data read out by the readout block 154.

The content executing section 140 executes the game software assuming that license information is present, and requests the data transferring section 150 to obtain data necessary for the progress of the game. In the data transferring section 150, the path obtaining block 152 may inquire of the file system 130 to obtain the path information of the data requested to be obtained, the readout block 154 may read out the data requested to be obtained from the media drive 32 to the memory 64 according to the path information, and the providing block 156 may provide the data temporarily stored in the memory 64 to the content executing section 140. The content executing section 140 thereby reads out and executes the game software recorded on the ROM medium 44.

Incidentally, as already described, the file system 130 associates the path of a file or data with a predetermined virtual mount point (for example "GAME0"), and thus manages the path of the file or the data. As described in the example of the downloaded game software and a patch, the file system 130 generates a virtual game directory, and manages the path information of the file to be accessed by the game. Relation between the files of the downloaded game software and the files of the patch approximates to relation between the files of the game software recorded on the ROM medium 44 and the files of the game software copied to the auxiliary storage device 2. That is, after the data of a file is copied to the auxiliary storage device 2, the copied data is set so as to be able to be read out from the auxiliary storage device 2 in the virtual game directory. The game can thereby access a desired file without being aware of whether the accessed file is recorded on the ROM medium 44 or recorded in the auxiliary storage device 2.

Incidentally, the file system 130 may manage files with finer granularity than files, that is, in data units constituting files. That is, when a part of data of a file is copied to the auxiliary storage device 2, the file system 130 may manage that the data is recorded in the auxiliary storage device 2. The game can thereby operate so as to read out data from the auxiliary storage device 2 as a high-speed device when the data is recorded in the auxiliary storage device 2, and read out data from the ROM medium 44 as a low-speed device when the data is not recorded in the auxiliary storage device 2.

Figure 11:
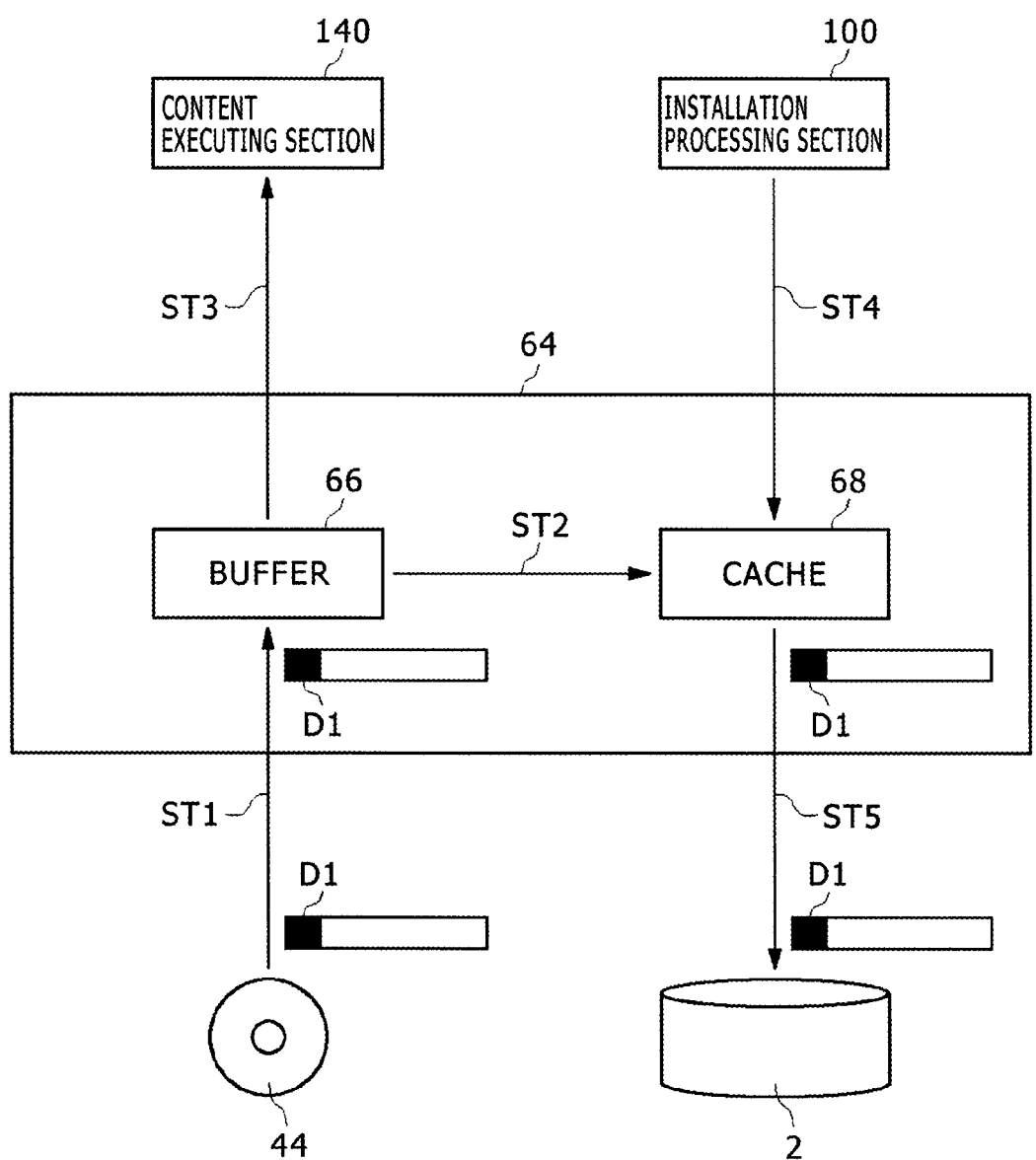
FIG. 11 is a diagram of assistance in explaining an example of the copy processing.

FIG. 11 is a diagram of assistance in explaining an example of copy processing. This copy processing assumes that the content executing section 140 is executing the game software. In the figure, D1 denotes data whose readout is requested by the game being executed by the content executing section 140. In FIG. 11, a buffer 66 is a memory for temporarily storing data to provide the data to the content executing section 140. In addition, a cache 68 is a memory for temporarily storing data read out from the ROM medium 44 to copy the data to the auxiliary storage device 2.

When the game requests the data transferring section 150 to read out the data D1, the path obtaining block 152 obtains the path information of the data D1 from the file system 130, the readout block 154 reads out the data D1 recorded on the ROM medium 44 from the media drive 32, and the buffer 66 temporarily stores the read-out data D1 (ST1). Incidentally, the path information may specify a sector of the ROM medium 44. Next, the readout block 154 copies the data D1 read out to the buffer 66 to the cache 68 (ST2). The providing block 156 provides the data D1 stored in the buffer 66 to the content executing section 140 (ST3). The game can thereby progress using the data D1.

In the installation processing section 100, the recording processing block 106 reads out the data stored in the cache 68 (ST4), and records the data in the auxiliary storage device 2 (ST5). Thus, the data read out to the buffer 66 according to the request from the game is not only provided to the game but also recorded in the auxiliary storage device 2, whereby the data can be copied from the low-speed device to the high-speed device. The data D1 copied to the auxiliary storage device 2 is read out from the auxiliary storage device 2 to the game when needed by the game next time. Incidentally, although the data D1 is copied from the buffer 66 to the cache 68 in ST2, this copy processing does not necessarily need to be performed. When this cache copy is not made, it suffices for the recording processing block 106 to read out the data D1 from the buffer 66, and record the data D1 in the auxiliary storage device 2.

Figure 12:
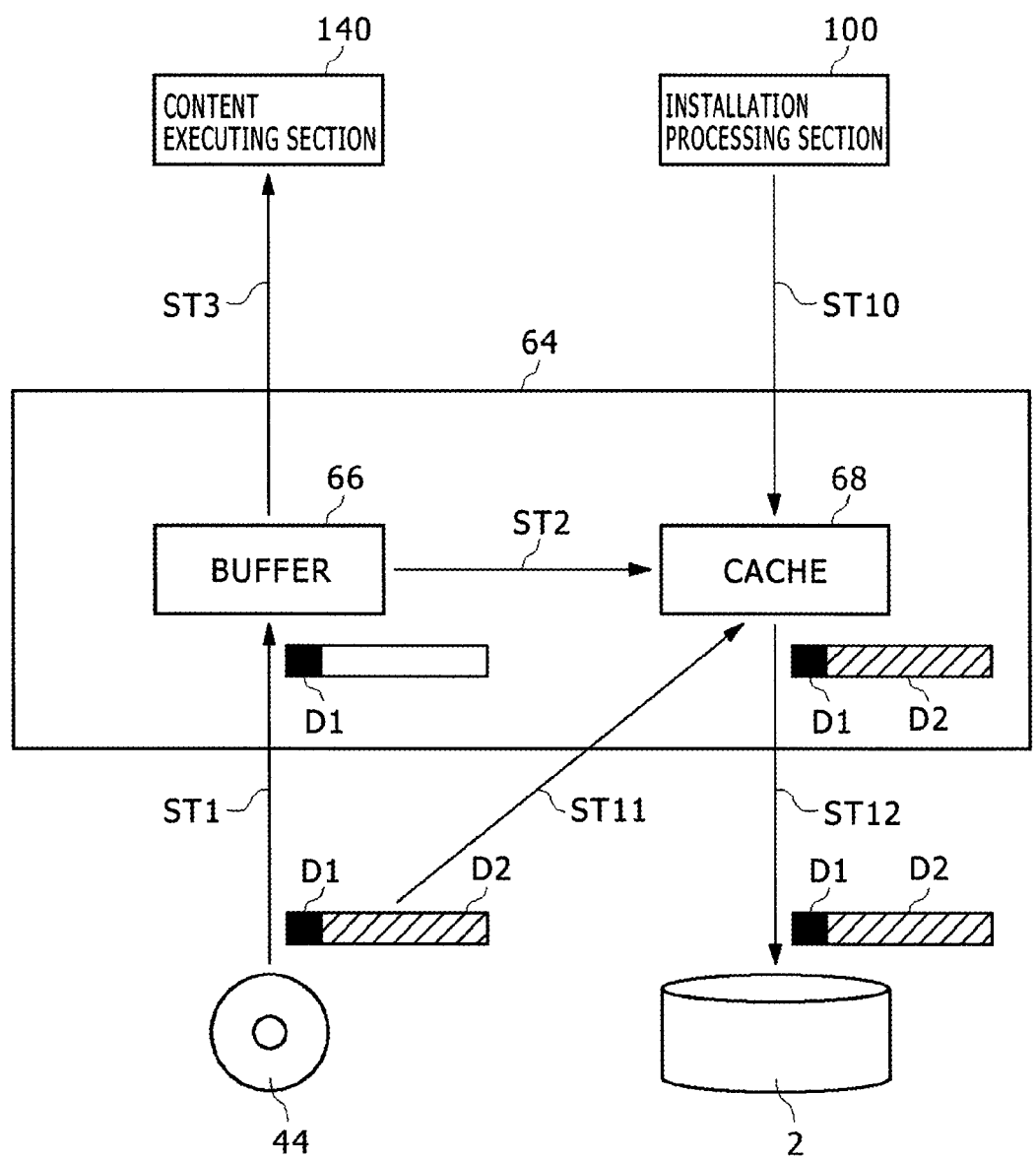
FIG. 12 is a diagram of assistance in explaining another example of the copy processing.

FIG. 12 is a diagram of assistance in explaining another example of copy processing. The explanatory diagram of FIG. 12 shows an extension type of the copy processing shown in FIG. 11. In the figure, D1 denotes data whose readout is requested by the game being executed by the content executing section 140. D2 denotes data read out incidentally, as it were, when the data D1 is read out. That is, the data D1 is data to be provided to the game, whereas the data D2 is so-called pre-read data. The data D2 is not provided to the game when the data D1 is provided to the game. The installation processing section 100 records the data D1 and D2 in the auxiliary storage device 2. Thus, in the extension type shown in FIG. 12, more data can be copied from the ROM medium 44 to the auxiliary storage device 2.

Specifically, when the game requests the data transferring section 150 to read out the data D1, the path obtaining block 152 obtains the path information of the data D1 from the file system 130, the readout block 154 reads out the data D1 recorded on the ROM medium 44 from the media drive 32, and the buffer 66 temporarily stores the read-out data D1 (ST1). Next, the readout block 154 copies the data D1 read out to the buffer 66 to the cache 68 (ST2). The providing block 156 provides the data D1 stored in the buffer 66 to the content executing section 140 (ST3). The game can thereby progress using the data D1.

In this extension type, when the readout block 154 reads out the data D1 from the ROM medium 44, the readout block 154 also reads out the data D2, and makes the cache 68 temporarily store the data D2.

Figure 13:
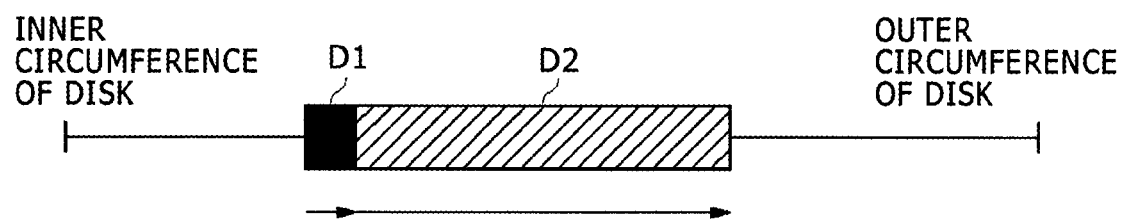
FIG. 13 is a diagram of assistance in explaining data pre-reading processing.

FIG. 13 is a diagram of assistance in explaining data pre-reading processing. When the readout block 154 reads out the data D1, the readout block 154 also pre-reads the data D2. The media drive 32 is provided with an optical pickup. The data D1 is read out by moving the optical pickup to the sector of the data D1 and obtaining laser reflected light. When the ROM medium 44 is a Blu-ray disk, for example, the recording processing block 106 instructs the readout block 154 to perform processing of pre-reading the data (D2) recorded in the same layer as the data D1 (ST10). Receiving the instruction, the readout block 154 reads out the other data (D2) to the memory 64 from the media drive 32 in addition to the data (D1) requested to be read out. At this time, the optical pickup is controlled to move from the sector of the data D1 to a sector located in an outer circumferential direction and also read out the data D2. The recording processing block 106 thus instructs the readout block 154 to perform the processing of pre-reading the other data (D2) present in the sector physically adjacent or close to the sector of the data D1 requested to be read out. In the example of FIG. 12, the readout block 154 reads out the data D1 to the buffer 66 (ST1), and reads out the data D2 to the cache 68 (ST11). The recording processing block 106 thereafter records the data (D1+D2) stored in the cache 68 in the auxiliary storage device 2 (ST12).

Thus, the data D1 read out to the buffer 66 according to the request from the game is not only provided to the game but also recorded in the auxiliary storage device 2, and the data D2 pre-read together with the data D1 is recorded in the auxiliary storage device 2. Therefore the data can be copied from the low-speed device to the high-speed device efficiently. The data D1 copied to the auxiliary storage device 2 is read out from the auxiliary storage device 2 to the game when needed by the game next time. Incidentally, although the data D1 is copied from the buffer 66 to the cache 68 in ST2, this copy processing does not necessarily need to be performed. When this cache copy is not made, it suffices for the recording processing block 106 to read out the data D1 from the buffer 66, and record the data D1 in the auxiliary storage device 2.

In a stage in which all of data constituting one file is copied to the auxiliary storage device 2, the data of the file may be read out from the auxiliary storage device 2. However, in a stage in which only a part of the data is copied to the auxiliary storage device 2, the part of the data may also be read out from the auxiliary storage device 2. Such data management is performed by the file system 130. When the file system 130 manages data with finer granularity, the game can efficiently use the data recorded in the high-speed device. The file system 130 thus manages locations where the data is recorded. The game therefore reads out necessary data from either the auxiliary storage device 2 or the ROM medium 44 to execute the game software.

Referring to FIG. 7, the determining block 108 determines whether files are recorded in the auxiliary storage device 2 in group units. The notifying block 110 notifies group identifying information identifying a group whose files are all recorded in the auxiliary storage device 2 to the game via the content executing section 140. When a part of data of files belonging to a group is not copied to the auxiliary storage device 2, the determining block 108 determines the group as a group not copied yet. Thereby the game can be informed about whether resource files constituting a game scene to be executed from now will be read out from the auxiliary storage device 2 or read out from the ROM medium 44. Incidentally, as already described, the data recorded in the auxiliary storage device 2 can be read out from the auxiliary storage device 2. However, when at least a part of the data is not copied to the auxiliary storage device 2, a source from which the data of the group is read out is the ROM medium 44, and thus the game treats the group as a group whose high-speed processing is difficult.

When data is read out from the ROM medium 44, it may be assumed that real-time processing of the data is difficult because of low readout speed. In this case, for example, the game may reduce an amount of data processing by lowering a display resolution so that the real-time processing is performed in time. The game may thus change the nature of data processing depending on whether the source from which data is read out is the ROM medium 44 or the auxiliary storage device 2.

Incidentally, the recording processing block 106 monitors data access to the ROM medium 44. When the content executing section 140 does not make a readout request for a predetermined time (for example 25 ms), the recording processing block 106 instructs the readout block 154 to perform data pre-reading processing. Receiving the instruction for the pre-reading processing, the readout block 154 reads out data not recorded in the auxiliary storage device 2 from the media drive 32 to the cache 68. The recording processing block 106 records the data read out to the cache 68 in the auxiliary storage device 2. At this time, when not all of files of a group currently being used by the game have completed being copied, the recording processing block 106 preferably makes the pre-reading processing of the data of the group performed preferentially. When the recording processing block 106 thus makes the data of the ROM medium 44 pre-read into the auxiliary storage device 2 while idle time of access to the ROM medium 44 is used efficiently, the copying of the files of the game software from the ROM medium 44 to the auxiliary storage device 2 can be completed in a short time. Incidentally, when the game specifies a group, the group determining block 112 determines the specified group as a group to be copied preferentially. In this case, the recording processing block 106 makes the pre-reading processing of the group determined in the group determining block 112 performed.

Incidentally, the content executing section 140 starts the game software assuming the presence of license information. The license information is recorded on the ROM medium 44, but is not copied to the auxiliary storage device 2. Hence, when the ROM medium 44 is not loaded in the media drive 32, the content executing section 140 cannot confirm the presence of the license information, and therefore does not execute the game software even if all of the files constituting the game software are recorded in the auxiliary storage device 2. Thus, while the information processing device 10 realizes high-speed game processing by copying the game software from the low-speed device to the high-speed device, the information processing device 10 prevents improper use of the game software by making the presence of the low-speed device having the license information recorded therein a condition for starting the game.

Incidentally, when the game is ended and the ROM medium 44 is removed from the media drive 32 before completion of the copy processing for copying into the auxiliary storage device 2, the download executing block 104 may download remaining files from the content server 12, and the recording processing block 106 may record the remaining files in the auxiliary storage device 2.

The present invention has been described above on the basis of embodiments thereof. The embodiments are illustrative, and it is to be understood by those skilled in the art that combinations of constituent elements and processing processes of the embodiments are susceptible of various modifications and that such modifications also fall within the scope of the present invention. In the embodiments, a game is shown as an example of an application. However, there may be other applications.

For example, when the game software is uninstalled, the recording processing block 106 may leave only the files belonging to the first group 72a in the auxiliary storage device 2, and delete the files belonging to the following groups from the auxiliary storage device 2. As already described, the content executing section 140 can start the game using only the files belonging to the first group 72a, and the download executing block 104 can download the files belonging to the following groups in the background. It is thus useful for the recording processing block 106 to leave only the first group 72a rather than deleting all of the files from the auxiliary storage device 2 because leaving only the first group 72a does not greatly affect the recording capacity of the auxiliary storage device 2. Incidentally, the icon of the game software uninstalled with only the first group left is changed from the icon representing the status of an end of the download of all of the groups to the icon representing the status of an end of the download of the first group as described earlier.

REFERENCE SIGNS LIST

1 . . . Information processing system, 2 . . . Auxiliary storage device, 3 . . . Network, 10 . . . Information processing device, 12 . . . Content server, 16 . . . Store server, 44 . . . ROM medium, 64 . . . Memory, 66 . . . Buffer, 68 . . . Cache, 70 . . . Game software, 90 . . . Input section, 100 . . . Installation processing section, 102 . . . Receiving block, 104 . . . Download executing block, 106 . . . Recording processing block, 108 . . . Determining block, 110 . . . Notifying block, 112 . . . Group determining block, 130 . . . File system, 140 . . . Content executing section, 150 . . . Data transferring section, 152 . . . Path obtaining block, 154 . . . Readout block, 156 . . . Providing block.

INDUSTRIAL APPLICABILITY

The present invention can be used in the field of information processing carried out by an information processing device such as a game device or the like.

The invention claimed is:

1. An information processing device comprising: a drive device loaded with a recording medium on which a plurality of files constituting an application are recorded;
   a readout block reading out respective pieces of data of the application from the drive device;
   a memory for temporarily storing the respective pieces of data read out by the readout block, such that over a period of time data representing an entirety of the application move into and out of the memory;
   a storage device for receiving the respective pieces of data of the application from the memory;
   an execution block for receiving the respective pieces of data of the application from the storage device in order to execute the application;
   a providing block for providing the respective pieces of data stored in the storage device to the application being executed; and
   a processing block moving the respective pieces of data stored in the memory to the storage device, such that over the period of time the data representing an entirety of the application move from the memory into the storage device, wherein:
   the processing block: (i) monitors specific times that the execution block application requests readout of one or more of the respective pieces of data of the application from the drive device, (ii) determines whether a predetermined amount of time has elapsed since a last specific time that the execution block application requested readout of one or more of the respective pieces of data of the application from the drive device, and (iii) when the determination is affirmative, the processing block causes at least some of the respective pieces of data of the application, which have not yet been moved from the drive device to the storage device, to be read from the drive device to the memory and stored in the storage device;
   each file included in the application belongs to at least one of a plurality of groups, and at least one the belongs to each group,
   a first of the plurality of groups includes a group file, a start-up file, and an essential resource file,
   the group the defines which of the plurality of files are in each of the plurality of groups, the start-up the is required to start a main executable program for facilitating the execution of the main executable program,
   the essential resource the includes at least one of an executable program and a data file that are required by the main executable program throughout execution thereof,
   the main executable program begins execution when the group file, the start-up file, and the essential resource the of the first of the plurality of groups are all stored in the storage device after having been: (i) read from the drive device and temporarily stored in the memory, and (ii) moved from the memory into the storage device, and
   substantially immediately after the group file, the start-up file, and the essential resource file of the first of the plurality of groups are all stored in the storage device, the main executable program of the application is executed even when not all the data representing an entirety of the application have yet been moved from the memory into the storage device and further of the respective pieces of data of the application are yet to be: (i) read from the drive device and temporarily stored in the memory, and (ii) moved from the memory into the storage device.

2. The information processing device according to claim 1, wherein:
   when the application requests readout of data necessary for progress of the application, the readout block reads out other data to the memory from the drive device in addition to the data requested to be read out;
   the providing block provides the respective pieces of data from the memory to the application; and
   the processing block records the respective pieces of data stored in the memory in the storage device.

3. The information processing device according to claim 1, wherein the application is a game application for facilitating interactive gameplay with a user.

4. The information processing device according to claim 1, wherein
   each file included in the application belongs to at least one of a plurality of groups, and at least one file belongs to each group; and
   the processing block includes
   a determining block determining whether files are recorded in the storage device in a group unit, and
   a notifying block notifying, to the application, group identifying information identifying a group whose files belonging to the group are all recorded in the storage device.

5. The information processing device according to claim 1, wherein unless the recording medium is loaded in the drive device, an application executing section does not execute the application even when all of the files constituting the application are recorded in the storage device.

6. The information processing device according to claim 1, wherein the temporarily storing includes: (i) at least one buffer receiving at least some of the respective pieces of data of the application, which are required by the application being executed, transferring the at least some of the respective pieces of data of the application to a content executing circuit for said executing the application simultaneously, and transferring the at least some of the respective pieces of data of the application to a cache memory, and (ii) the cache memory receiving the at least some of the respective pieces of data of the application from the at least one buffer, and transferring the at least some of the respective pieces of data of the application to the storage device.

7. A data copying method comprising:
   reading out respective pieces of data of an application from a drive device loaded with a recording medium on which a plurality of files constituting the application are recorded;
   temporarily storing the respective pieces of data in a memory for temporarily storing the respective pieces of data read out, such that over a period of time data representing an entirety of the application move into and out of the memory;
   receiving the respective pieces of data of the application from the memory into a storage device;
   receiving the respective pieces of data of the application from the storage device in order to execute the application;

providing the respective pieces of data stored in the storage device to the application; and moving the respective pieces of data stored in the memory to the storage device, such that over the period of time the data representing an entirety of the application move from the memory into the storage device, wherein:

the method includes: (i) monitoring specific times that the execution of the application requests readout of one or more of the respective pieces of data of the application from the drive device, (ii) determining whether a predetermined amount of time has elapsed since a last specific time that the execution of the application requested readout of one or more of the respective pieces of data of the application from the drive device, and (id) when the determination is affirmative, causing at least some of the respective pieces of data of the application, which have not yet been moved from the drive device to the storage device, to be read from the drive device to the memory and stored in the storage device;

each the included in the application belongs to at least one of a plurality of groups, and at least one the belongs to each group, a first of the plurality of groups includes a group file, a start-up file, and an essential resource file, the group the defines which of the plurality of files are in each of the plurality of groups, the start-up file is required to start a main executable program for facilitating the execution of the main executable program, the essential resource file includes at least one of an executable program and a data the that are required by the main executable game program throughout execution thereof, the main executable program begins execution when the group file, the start-up file, and the essential resource the of the first of the plurality of groups are all stored in the storage device after having been: (i) read from the drive device and temporarily stored in the memory, and (ii) moved from the memory into the storage device, and substantially immediately after the group file, the start-up file, and the essential resource file of the first of the plurality of groups are all stored in the storage device, the main executable game program of the application is executed even when not all the data representing an entirety of the application have vet been moved from the memory into the storage device and further of the respective pieces of data of the application are yet to be: (i) read from the drive device and temporarily stored in the memory, and (ii) moved from the memory into the storage device.

8. A non-transitory, computer readable storage medium containing a program for causing a computer to execute actions, comprising:

reading out respective pieces of data of an application from a drive device loaded with a recording medium on which a plurality of files constituting the application are recorded;

temporarily storing the respective pieces of data in a memory for temporarily storing the respective pieces of data read out, such that over a period of time data representing an entirety of the application move into and out of the memory;

receiving the respective pieces of data of the application from the memory into a storage device;

receiving the respective pieces of data of the application from the storage device in order to execute the application;

providing the respective pieces of data stored in the storage device to the application; and moving the respective pieces of data stored in the memory to the storage device, such that over the period of time the data representing an entirety of the application move from the memory into the storage device, wherein;

the method includes: (i) monitoring specific times that the execution of the application requests readout of one or more of the respective pieces of data of the application from the drive device, (ii) determining whether a predetermined amount of time has elapsed since a last specific time that the execution of the application requested readout of one or more of the respective pieces of data of the application from the drive device, and (iii) when the determination is affirmative, causing at least some of the respective pieces of data of the application, which have not yet been moved from the drive device to the storage device, to be read from the drive device to the memory and stored in the storage device;

each file included in the application belongs to at least one of a plurality of groups, and at least one the belongs to each group, a first of the plurality of groups includes a group file, a start-up file, and an essential resource file, the group the defines which of the plurality of files are in each of the plurality of groups, the start-up the is required to start a main executable program for facilitating the execution of the main executable program, the essential resource the includes at least one of an executable program and a data the that are required by the main executable game program throughout execution thereof, the main executable program begins execution when the group file, the start-up file, and the essential resource the of the first of the plurality of groups are all stored in the storage device after having been: (i) read from the drive device and temporarily stored in the memory, and (ii) moved from the memory into the storage device, and substantially immediately after the group file, the start-up file, and the essential resource file of the first of the plurality of groups are all stored in the storage device, the main executable game program of the application is executed even when not all the data representing an entirety of the application have vet been moved from the memory into the storage device and further of the respective pieces of data of the application are yet to be: (i) read from the drive device and temporarily stored in the memory, and (ii) moved from the memory into the storage device.

* * * * *